United States Patent
Zhang et al.

(10) Patent No.: US 11,039,143 B2
(45) Date of Patent: Jun. 15, 2021

(54) MEMORY REDUCTION FOR CONTEXT INITIALIZATION WITH TEMPORAL PREDICTION

(71) Applicant: QUALCOMM Incorporated, San Diego, CA (US)

(72) Inventors: Li Zhang, San Diego, CA (US); Wei-Jung Chien, San Diego, CA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/195,590

(22) Filed: Nov. 19, 2018

(65) Prior Publication Data

US 2019/0158837 A1 May 23, 2019

Related U.S. Application Data

(60) Provisional application No. 62/588,867, filed on Nov. 20, 2017.

(51) Int. Cl.
*H04N 19/13* (2014.01)
*H04N 19/17* (2014.01)
(Continued)

(52) U.S. Cl.
CPC ............ *H04N 19/13* (2014.11); *H04N 19/17* (2014.11); *H04N 19/187* (2014.11);
(Continued)

(58) Field of Classification Search
CPC .... H04N 19/13; H04N 19/159; H04N 19/167; H04N 19/174; H04N 19/176;
(Continued)

(56) References Cited

U.S. PATENT DOCUMENTS

2009/0304075 A1* 12/2009 Ogura ................ H04N 19/70
375/240.12
2015/0334425 A1* 11/2015 He ...................... H04N 19/13
375/240.03
(Continued)

FOREIGN PATENT DOCUMENTS

EP 2945383 A1 11/2015

OTHER PUBLICATIONS

Alshin A., et al., "CE1 (subset B): Multi-parameter probability up-date for CABAC", Nov. 21-30, 2011; (Joint Collaborative Team on Video Coding (JCT-VC) of ITU-T SG16 WP3 and ISO/IEC JTC1/SC29/WG11), doc. No. JCTVC-G764, 7th Meeting: Geneva, Nov. 18, 2011; 4 pages.

(Continued)

*Primary Examiner* — Jamie J Atala
*Assistant Examiner* — Hesham K Abouzahra
(74) *Attorney, Agent, or Firm* — Shumaker & Sieffert, P.A.

(57) ABSTRACT

A method of decoding video data includes determining, by a video decoder implemented in processing circuitry, a context initialization using a plurality of quantization parameters for a portion of a picture of video data decoded using temporal prediction. The method includes storing, by the video decoder, the context initialization with a single probability state for the plurality of quantization parameters. The method includes entropy decoding, by the video decoder, a set of syntax elements in a bitstream using the single probability state.

26 Claims, 16 Drawing Sheets

(51) Int. Cl.
| | |
|---|---|
| *H04N 19/187* | (2014.01) |
| *H04N 19/96* | (2014.01) |
| *H04N 19/91* | (2014.01) |
| *H04N 19/124* | (2014.01) |
| *H04N 19/159* | (2014.01) |
| *H04N 19/167* | (2014.01) |
| *H04N 19/174* | (2014.01) |
| *H04N 19/176* | (2014.01) |
| *H04N 19/177* | (2014.01) |
| *H04N 19/184* | (2014.01) |
| *H04N 19/55* | (2014.01) |
| *H04N 19/70* | (2014.01) |

(52) U.S. Cl.
CPC .......... *H04N 19/124* (2014.11); *H04N 19/159* (2014.11); *H04N 19/167* (2014.11); *H04N 19/174* (2014.11); *H04N 19/176* (2014.11); *H04N 19/177* (2014.11); *H04N 19/184* (2014.11); *H04N 19/55* (2014.11); *H04N 19/70* (2014.11); *H04N 19/91* (2014.11); *H04N 19/96* (2014.11)

(58) Field of Classification Search
CPC .... H04N 19/177; H04N 19/184; H04N 19/55; H04N 19/70
See application file for complete search history.

(56) References Cited

U.S. PATENT DOCUMENTS

| | | |
|---|---|---|
| 2016/0353112 A1 | 12/2016 | Zhang et al. |
| 2019/0116358 A1* | 4/2019 | Zhang ..................... H04N 19/86 |
| 2019/0200043 A1 | 6/2019 | Egilmez et al. |

OTHER PUBLICATIONS

Alshin, et al., "Multi-parameter probability up-date for CABAC," Joint Collaborative Team on Video Coding (JCT-VC) of ITU-T SG16 WP3 and ISO/IEC JTC1/SC29/WG11 6th Meeting: Torino, IT, Jul. 14-22, 2011, JCTVC-F254, pp. 1-5.
Bross B., et al., "High Efficiency Video Coding (HEVC) Text Specification Draft 10 (for FDIS & Last Call)," 12th Meeting: Geneva, CH, Jan. 14-23, 2013, (Joint Collaborative Team on Video Coding of ISO/IEC JTC 1/SC 29/WG11 and ITU-T SG 16 WP 3); JCTVC-L1003_v34, Mar. 19, 2013, 310 pages.
Bross B., et al., "Versatile Video Coding (Draft 1)", Joint Video Experts Team (JVET) of ITU-T SG 16 WP 3 and ISO/IEC JTC 1/SC 29/WG 11, 10th Meeting, Apr. 2018, JVET-J1001-v2, 43 pages.
Chen J., et al., "Algorithm description for Versatile Video Coding and Test Model 1 (VTM 1)", Joint Video Experts Team (JVET) of ITU-T SG 16 WP 3 and ISO/IEC JTC 1/SC 29/WG 11, 10th Meeting: San Diego, US, Apr. 10-20, 2018, JVET-J1002-v2, 10 pages.
International Search Report and Written Opinion—PCT/US2018/062012—ISA/EPO—dated Feb. 28, 2019.
ITU-T H.261, Line Transmission of Non-Telephone Signals, Video Codec for Audiovisual Services At p × 64 kbits, The International Telecommunication Union, Mar. 1990, 32 pp.
ITU-T H.263, "Video Coding for Low Bit Rate Communication", Series H: Audiovisual and Multimedia Systems, Infrastructure of audiovisual services—Coding of moving video, Jan. 2005, 226 pages.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
"ITU-T H.265, Series H: Audiovisual and Multimedia Systems, Infrastructure of audiovisual services—Coding of moving video, High efficiency video coding," The International Telecommunication Union, Apr. 2015, 634 pp.
Marpe D., et al., "Context-Based Adaptive Binary Arithmetic Coding in the H.264/AVC Video Compression Standard", IEEE Transactions on Circuits and Systems for Video Technology, vol. 13, No. 7, Jul. 1, 2003, pp. 620-636, XP055120073, ISSN: 1051-8215, DOI: 10.1109/TCSVT.2003.815173.
Marpe D., et al., "Transform Coding Using the Residual Quadtree (RQT)", Fraunhofer Heinrich Hertz Institute, 4pp. URL: http://www.hhi.fraunhofer.de/fields-of-competence/image-processing/researchgroups/ image-video-coding/hevc-high-efficiency-video-coding/transform-coding-using-the-residual-quadtree-rqt.html ; [ Retrieved on Feb. 9, 2017].
Nguyen, et al., "Non-CE11: Proposed Cleanup for Transform Coefficient Coding," Document JCTVC-H0228, Joint Collaborative Team on Video Coding (JCT-VC) of ITU-T SG16 WP3 and ISO/IEC JTC1/SC29/WG11, 8th Meeting: San José, CA, USA, XP030111255, Feb. 1-10, 2012, pp. 1-9.
Sze V., et al., "High Throughput Cabac Entropy Coding in HEVC", IEEE Transactions on Circuits and Systems for Video Technology, IEEE Service Center, Piscataway, NJ, US, vol. 22, No. 12, Dec. 1, 2012 (Dec. 1, 2012), pp. 1778-1791, XP011487151, ISSN: 1051-8215, DOI: 10.1109/TCSVT.2012.2221526.
ITU-T Rec.H.262, Transmission of Non-Telephone Signals: Information Technology—Generic Coding of Moving Pictures and Associated Audio Information: Video, The International Telecommunication Union, Jul. 10, 1995, 211 pp.
Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.
Albrecht, M., et al., "Description of SDR, HDR, and 360° video coding technology proposal by Fraunhofer HHI," 10th Meeting: San Diego, CA, Apr. 10-20, 2018, (Joint Video Experts Team (JVET) of ITU-T SG16 WP 3 and ISO/IEC JTC 1/SC 29/WG 11, JVET-J0014-v4, 123 pages.
Chen Y., et al., "Description of SDR, HDR and 360° video coding technology proposal by Qualcomm and Technicolor—low and high complexity versions," 10th Meeting: San Diego, CA, Apr. 10-20, 2018, (Joint Video Exploration Team (JVET) of ITU-T SG 16 WP 3 and ISO/IEC JTC 1/SC 29/WG 11, JVET-J0021, 43 pages.
Stegemann J., et al., "CE5: Counter-based probability estimation and changes to the arithmetic coding engine(CE5.2, CE5.A2, CE5.B2 and CE5.C2)," 11th Meeting: Ljubljana, SI, Jul. 10-18, 2018, Joint Video Experts Team (JVET) of ITU-T SG 16 WP 3 and ISO/IEC JTC 1/SC 29/WG 11, JVET-K0283-v3, 26 pages.
Said, A., et al., "CE5: Combined Arithmetic Coding Tools (Test CE 5.1)," 11th Meeting: Ljubljana, SI, Jul. 10-18, 2018, Joint Video Experts Team (JVET) of ITU-T SG 16 WP 3 and ISO/IEC JTC 1/SC 29/WG 11, JVET-K0381-v1, 5 pages.
Said, A., et al., "CE5: CABAC probability initialization from previous inter frames (test C1)," 11th Meeting: Ljubljana, SI, Jul. 10-18, 2018, Joint Video Experts Team (JVET) of ITU-T SG 16 WP 3 and ISO/IEC JTC 1/SC 29/WG 11, JVET-K0379-v1, 4 pages.
Choi, K., et al., "CE5: Counter-based probability estimation (Test 2.4)," 11th Meeting: Ljubljana, SI, Jul. 10-18, 2018, Joint Video Experts Team (JVET) of ITU-T SG 16 WP 3 and ISO/IEC JTC 1/SC 29/WG 11, JVET-K0170-v1, 4 pages.

* cited by examiner

MEMORY REDUCTION FOR CONTEXT INITIALIZATION WITH TEMPORAL PREDICTION

This application claims the benefit of U.S. Provisional Patent Application 62/588,867, filed on Nov. 20, 2017, the entire content of which is hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized.

SUMMARY

In general, this disclosure describes techniques related to the entropy coding, and more particularly, context initialization using for entropy coding. For example, a video decoder may perform Context-Adaptive Binary Arithmetic Coding (CABAC) for a current picture (or portion of the picture) using a context initialization determined from a previously decoded picture (or portion of the previously decoded picture). In some examples, rather than storing a probability value for each quantization parameter, a video coder (e.g., video encoder, video decoder, etc.) may store a single probability state for (consecutive) quantization parameters. Additionally, or alternatively, a video coder may perform entropy coding for a portion of the picture using a context initialization determined from a portion of a previously decoded picture in response to determining a temporal layer for the portion of the picture is enabled, in response to determining that the plurality of quantization parameters is enabled, and/or in response to determining that a group assigned to the portion is enabled. In this way, a memory use of the video coder for storing the context initialization may be reduced while permitting improved coding efficiency from using context initialization with temporal prediction. One or more techniques described herein, may be applied to any of the existing video codecs, such as HEVC (High Efficiency Video Coding) or be may be used in any future video coding standards, such as H.266.

In one example, a method of decoding video data includes: determining, by a video decoder implemented in processing circuitry, a context initialization using a plurality of quantization parameters for a portion of a picture of video data decoded using temporal prediction; storing, by the video decoder, the context initialization with a single probability state for the plurality of quantization parameters; and entropy decoding, by the video decoder, a set of syntax elements in a bitstream using the single probability state.

In another example, a device for decoding video data includes one or more storage media; and one or more processors configured to: determine a context initialization using a plurality of quantization parameters for a portion of a picture of video data decoded using temporal prediction; store, at the one or more storage media, the context initialization with a single probability state for the plurality of quantization parameters; and entropy decode a set of syntax elements in a bitstream using the single probability state.

In another example, a computer-readable storage medium is encoded with instructions that, when executed, cause a programmable processor to: determine a context initialization using a plurality of quantization parameters for a portion of a picture of video data decoded using temporal prediction; store, at the one or more storage media, the context initialization with a single probability state for the plurality of quantization parameters; and entropy decode a set of syntax elements in a bitstream using the single probability state.

In another example, a device for decoding video data includes means for determining a context initialization using a plurality of quantization parameters for a portion of a picture of video data decoded using temporal prediction; means for storing the context initialization with a single probability state for the plurality of quantization parameters; and means for entropy decoding a set of syntax elements in a bitstream using the single probability state.

In another example, a method for encoding video data includes: determining, by a video encoder implemented in processing circuitry, a context initialization using a plurality of quantization parameters for a portion of a picture of video data encoded using temporal prediction; storing, by the video encoder, the context initialization with a single probability state for the plurality of quantization parameters; and entropy encoding, by the video encoder, a set of syntax elements in a bitstream using the single probability state.

In another example, a device for encoding video data includes one or more storage media configured to store video data; and one or more processors configured to: determine a context initialization using a plurality of quantization parameters for a portion of a picture of video data encoded using temporal prediction; store, at the one or more storage media, the context initialization with a single probability state for the plurality of quantization parameters; and entropy encode a set of syntax elements in a bitstream using the single probability state.

In another example, a computer-readable storage medium is encoded with instructions that, when executed, cause a programmable processor to: determine a context initialization using a plurality of quantization parameters for a portion of a picture of video data encoded using temporal prediction; store, at the one or more storage media, the context initialization with a single probability state for the plurality of quantization parameters; and entropy encode a set of syntax elements in a bitstream using the single probability state.

In another example, a device for decoding video data includes means for determining a context initialization using a plurality of quantization parameters for a portion of a picture of video data encoded using temporal prediction; means for storing the context initialization with a single probability state for the plurality of quantization parameters; and means for entropy encoding a set of syntax elements in a bitstream using the single probability state.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Entropy coding video data using a context initialization may increase a compression rate of video data transmitted, which may reduce an amount of video data transmitted. However, a video coder (e.g., a video encoder, a video decoder, etc.) configured for entropy coding video data using a context initialization may have an increased memory usage for storing context initialization compared to a video coder that does not use context initialization.

Techniques described herein may reduce a usage of memory by video coders for context initialization techniques, particularly Context Initialization with Temporal Prediction (CITP). For example, by configuring a video coder to determine context initialization using multiple quantization parameters for a portion of a picture of video data decoded using temporal prediction and storing the context initialization with a single probability state for the quantization parameters, the video coder may reduce a number of probability states stored in the memory for the multiple quantization parameters. In this way, a video coder may reduce an amount of memory used for storing context initialization, which may improve a processing performance of the video coder and/or reduce a power usage by the video coder.

Figure 1:
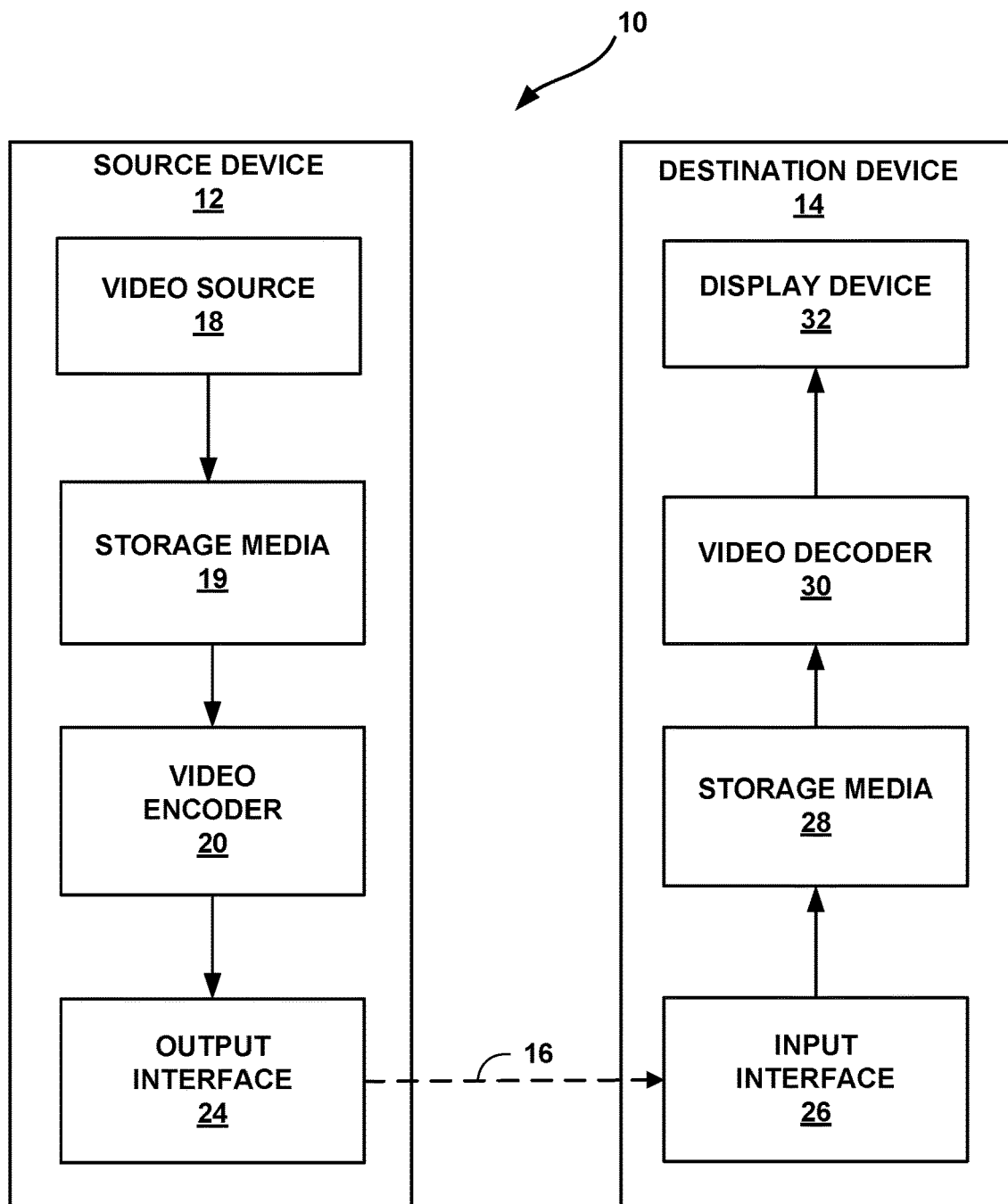
FIG. 1 is a block diagram illustrating an example video encoding and decoding system that may utilize one or more techniques described in this disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may include any of a wide range of devices, including a wireless communication device, desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped to support a wireless communication standard. Thus, source device 12 and destination device 14 may be wireless communication devices. Source device 12 is an example video encoding device (i.e., a device for encoding video data). Destination device 14 is an example video decoding device (i.e., a device for decoding video data).

In the example of FIG. 1, source device 12 includes a video source 18, storage media 19 configured to store video data, a video encoder 20, and an output interface 24. Destination device 14 includes an input interface 26, a storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing and/or coding video data may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may include one or more data storage media (e.g., storage media 19) configured to store the video data. The techniques described in this disclosure may be applicable to video coding in general, and may be applied to wireless and/or wired applications. In each case, the captured, pre-captured, or computer-generated video may be encoded by video encoder 20. Output interface 24 may output the encoded video information to a computer-readable medium 16.

Destination device 14 may receive the encoded video data to be decoded via computer-readable medium 16. Computer-readable medium 16 may include any type of medium or device capable of moving the encoded video data from source device 12 to destination device 14. In some examples, computer-readable medium 16 includes a communication medium to enable source device 12 to transmit encoded video data directly to destination device 14 in real-time. The encoded video data may be modulated according to a wireless communication standard, such as a wireless communication standard, and transmitted to destination device 14. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may include one or more data storage media configured to store encoded video data and decoded video data.

In some examples, encoded data may be output from output interface 24 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 (also referred to herein as "receiver") of destination device 14 receives (e.g., demodulates) information from computer-readable medium 16. The information of computer-readable medium 16 may include syntax information defined by video encoder 20 of video encoder 20, which is also used by video decoder 30, that includes syntax elements that describe characteristics and/or processing of blocks and other coded units, e.g., groups of pictures (GOPs). Storage media 28 may be configured to store encoded video data, such as encoded video data (e.g., a bitstream) received by input interface 26. Display device 32 displays the decoded video data to a user, and may include any of a variety of display devices such as a cathode ray tube (CRT), a liquid crystal display (LCD), a plasma display, an organic light emitting diode (OLED) display, or another type of display device.

Video encoder 20 and video decoder unit 30 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 may operate according to a video coding standard such as an existing or future standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, example video coding standards include, but are not limited to, a new video coding standard, namely High Efficiency Video Coding (HEVC) or ITU-T H.265, including its range extension, multiview extension (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). The latest HEVC draft specification, and referred to as HEVC WD hereinafter, is available from http://phenix.int-evry.fr/jct/doc_end_user/documents/14_Vienna/wg11/JCTVC-N1003-v1.zip/ As examples, transform coefficient coding, as well as Context-Adaptive Binary Arithmetic Coding (CABAC), which may be discussed in terms of design aspects of HEVC, but may be used with in other standard or implementation of video coding.

An early draft for new video coding standard, referred to as the H.266/Versatile Video Coding (VVC) standard, is available in the document JVET-J1001 "Versatile Video Coding (Draft 1)" by Benjamin Bross, and its algorithm description is available in the document JVET-J1002 "Algorithm description for Versatile Video Coding and Test Model 1 (VTM 1)" by Jianle Chen and Elena Alshina. The techniques of this disclosure, however, are not limited to any particular coding standard. Video encoder 20 and video decoder 30 may operate according to any video coding standard, such as HEVC, VVC, proprietary or other industry standards, such as the Joint Exploration Test Model (JEM), etc. The techniques of this disclosure, however, are not limited to any particular coding standard.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may encode blocks of a picture of the video data. Video encoder 20 may include, in a bitstream, an encoded representation of the video block. For example, video encoder 20 generates a context initialization for a portion of a picture of video data decoded. As used herein, context initialization may indicate parameters for probability models used in entropy coding video data. Examples of context initialization may include, but are not limited to, one or more probability states, one or more initialization tables, or other context initialization. In this example, video encoder 20 entropy encodes a set of syntax elements in a bitstream using the context initialization. For example, in HEVC, to generate an encoded representation of a picture, video encoder 20 may generate a set of coding tree units (CTUs) ordered consecutively in a raster scan order. Each of the CTUs may include one or more coding tree blocks (CTBs) and may include syntax structures used to code the samples of the one or more coding tree blocks. For instance, each a CTU may include a coding tree block of luma samples, two corresponding coding tree blocks of chroma samples, and syntax structures used to code the samples of the coding tree blocks. In monochrome pictures or pictures having three separate color planes, a CTU may include a single coding tree block and syntax structures used to code the samples of the coding tree block. A coding tree block may be an N×N block of samples. A CTU may also be referred to as a "tree block" or a "largest coding unit" (LCU). A syntax structure may be defined as zero or more syntax elements present together in the bitstream in a specified order. The size of a CTB can range from 16×16 to 64×64 in the HEVC main profile (although technically 8×8 CTB sizes can be supported).

A coding unit (CU) may be the same size as a CTU although and as small as 8×8. Each coding unit is coded with one mode. When a CU is inter coded, it may be further partitioned into 2 or 4 prediction units (PUs) or become just one PU when further partition does not apply. When two PUs are present in one CU, they can be half size rectangles or two rectangle size with ¼ or ¾ size of the CU. When a CU is inter coded, one set of motion information is present for each PU.

To predict a CU, video encoder 20 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 20 may generate the prediction block using one or more motion vectors. Video encoder 20 may generally perform a motion search to identify a reference block that closely matches the CU, e.g., in terms of differences between the CU and the reference block. Video encoder 20 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 20 may predict the current CU using uni-directional prediction or bi-directional prediction.

JEM/VVC also provides an affine motion compensation mode, which may be considered an inter-prediction mode. In affine motion compensation mode, video encoder 20 may determine two or more motion vectors that represent non-translational motion, such as zoom in or out, rotation, perspective motion, or other irregular motion types.

To perform intra-prediction, video encoder 20 may select an intra-prediction mode to generate the prediction block. Examples of JEM/VVC provides sixty-seven intra-prediction modes, including various directional modes, as well as planar mode and DC mode. In general, video encoder 20 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 20 codes CTUs and CUs in raster scan order (left to right, top to bottom).

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

Figure 2A:
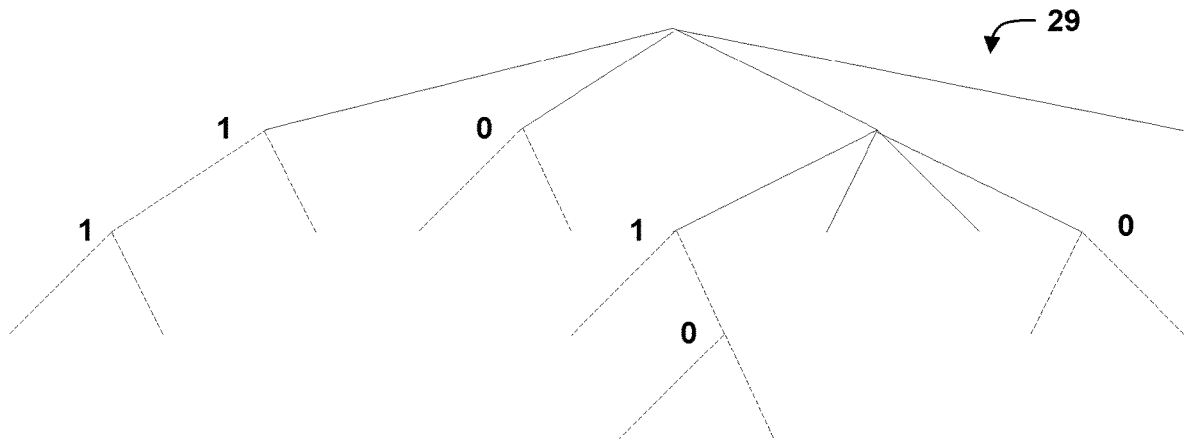
FIGS. 2A and 2B are conceptual diagrams illustrating an example quadtree binary tree (QTBT) structure, and a corresponding coding tree unit (CTU).
Figure 2B:
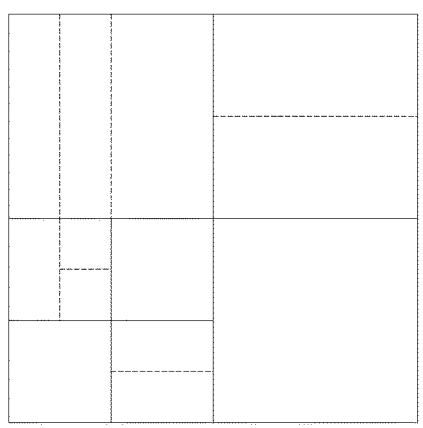

FIGS. 2A and 2B are conceptual diagrams illustrating an example quadtree binary tree (QTBT) structure 29, and a corresponding coding tree unit (CTU) 31. A video encoder may apply the concepts illustrated in FIGS. 2A and 2B to generate video data to be entropy encoded in a bitstream using a context initialization. In some examples, a video decoder may apply the concepts illustrated in FIGS. 2A and 2B to entropy decode video data in a bitstream using a context initialization. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 20 may encode, and video decoder 30 may decode, syntax elements (such as splitting information) for a region tree level of QTBT structure 29 (i.e., the solid lines) and syntax elements (such as splitting information) for a prediction tree level of QTBT structure 29 (i.e., the dashed lines). Video encoder 20 may encode, and video decoder 30 may decode, video data, such as prediction and transform data, for CUs represented by terminal leaf nodes of QTBT structure 29.

In general, CTU 31 of FIG. 2B may be associated with parameters defining sizes of blocks corresponding to nodes of QTBT structure 29 at the first and second levels. These parameters may include a CTU size (representing a size of CTU 31 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

A video encoder 20 may decompose the residual blocks of a CU into one or more transform blocks. For instance, video encoder 20 may use quad-tree partitioning to decompose the residual blocks of a CU into one or more transform blocks as described above. A transform block is a rectangular (e.g., square or non-square) block of samples on which the same transform is applied. A transform unit (TU) of a CU may include one or more transform blocks. For example, a TU may include a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

Video encoder 20 may apply one or more transforms a transform block of a TU to generate a coefficient block for the TU. For instance, video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block, video encoder 20 may quantize the coefficient block. Quantization generally refers to a process in which transform coefficients are quantized to possibly reduce the amount of data used to represent the transform coefficients, providing further compression. In some examples, video encoder 20 skips quantization. After video encoder 20 quantizes a coefficient block, video encoder 20 may generate syntax elements indicating the quantized transform coefficients. Video encoder 20 may entropy encode one or more of the syntax elements indicating the quantized transform coefficients. For example, video encoder 20 may perform Context-Adaptive Binary Arithmetic Coding (CABAC) on the syntax elements indicating the quantized transform coefficients.

CABAC is a method of entropy coding introduced in H.264/AVC, D. Marpe, H. Schwarz, and T. Wiegand, "Context-based adaptive binary arithmetic coding in the H.264/AVC video compression standard," IEEE Trans. Circuits Syst. Video Technol., vol. 13, no. 7, pp. 620-636, July 2003 and now used in the newest standard High Efficiency Video Coding (HEVC). CABAC involves three main functions: binarization, context modeling, and arithmetic coding. Binarization maps syntax elements to binary symbols (bins) which are called bin strings. Context modeling estimates the probability of the bins. Finally, binary arithmetic coder compresses the bins to bits based on the estimated probability.

Several different binarization processes can be used, including, for example, unary (U), truncated unary, kth-order Exp-Golomb (EGk), and fixed length (FL). Further details of binarization processes may be found in, but are not limited to, V. Sze and M. Budagavi, "High throughput CABAC entropy coding in HEVC," IEEE Transactions on Circuits and Systems for Video Technology (TCSVT), vol. 22, no. 12, pp. 1778-1791, December 2012.

Context modeling provides more accurate probability estimation which is helpful in achieving high coding efficiency. Accordingly, context modeling is highly adaptive. Different context models can be used for different bins where the probability of the context models is updated based on the values of previously coded bins. Bins with similar distributions may share the same context model. A video coder may select the context model for each bin based on the type of syntax element, bin position in syntax element (binIdx), luma/chroma, neighboring information, etc.

Context switching may occur after each bin is coded. A video coder may store the probability models as 7-bit entries (e.g., 6 bits for the probability state and 1 bit for the most probable symbol (MPS)) in context memory and addressed using the context index computed by context selection logic. A video coder may use the same probability update method as H.264/AVC. However, the video coder may apply context selection logic that is modified to improve throughput.

For CABAC, 64 representative probability values $p_\sigma \in$ [0.01875, 0.5] may be derived for the LPS (least probable symbol) by the following recursive equation:

$$p_\sigma = \alpha * p_{\sigma-1} \text{ for all } \sigma = 1, \ldots, 63 \quad (1)$$

$$\text{with } \alpha = \left(\frac{0.01875}{0.5}\right)^{1/63}$$

Here, both the chosen scaling factor $\alpha \approx 0.9492$ and the cardinality N=64 of the set of probabilities represent an example compromise between the desire for fast adaptation. The probability of the MPS (most probable symbol, i.e., 1−LPS) is equal to 1 minus the probability of LPS. Therefore, the probability range that could be represented by CABAC is [0.01875, 0.98125 (=1−0.01875)].

Before coding one slice, the probability models may be initialized based on some pre-defined values. For example, given an input quantization parameter denoted by qp and the pre-defined value denoted by initVal, the 7-bit entry of the probability model (denoted by state and MPS) may be derived as follows:

$qp = \text{Clip3}(0, 51, qp);$ $\text{slope} = (\text{initVal} \gg 4) * 5 - 45;$ $\text{offset} = ((\text{initVal} \& 15) \ll 3) - 16; \quad (2)$ $\text{initState} = \min(\max(1, (((\text{slope} * qp) \gg 4) + \text{offset})), 126);$ $mp\text{State} = (\text{initState} \geq 64);$ $\text{state index} = ((mp\text{State}?(\text{initState}-64):(63-\text{initState})) \ll 1) + mp\text{State};$ Where mpState and initState are intermediate variables.

Note that the derived state index may implicitly include the MPS information, e.g., when the state index is an even value, the MPS value is equal to 0; otherwise, when the state index is an odd value, the MPS value is equal to 1. initVal is in a range of [0, 255] with 8-bit precision.

Note that the pre-defined initVal may be slice-dependent, e.g., three sets of context initialization parameters for those probability models specifically used in I, P and B slices, respectively. In this way, video encoder 20 may be enabled to choose for these slice types between three initialization tables such that a better fit to different coding scenarios and/or different types of video content can be achieved.

Another tool may be applied to allow one P (or B) slice to be initialized with B (or P) slices. The related syntax elements, semantics and decoding process from HEVC are described as follows.

Table 9-4 of HEVC

| | Descriptor |
|---|---|
| slice_segment_header( ) { | |
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |
|   if( !dependent_slice_segment_flag ) { | |
|     for( i = 0; i < num_extra_slice_header_bits; i++ ) | |
|       slice_reserved_flag[ i ] | u(1) |
|     slice_type | ue(v) |
|     if( output_flag_present_flag ) | |
|       pic_output_flag | u(1) |
|     if( separate_colour_plane_flag == 1 ) | |
|       colour_plane_id | u(2) |
|     if( nal_unit_type != IDR_W_RADL && nal_unit_type != IDR_N_LP ) { | |
|       slice_pic_order_cnt_lsb | u(v) |
|       short_term_ref_pic_set_sps_flag | u(1) |
|       if( !short_term_ref_pic_set_sps_flag ) | |
|         short_term_ref_pic_set( num_short_term_ref_pic_sets ) | |
|       else if( num_short_term_ref_pic_sets > 1 ) | |
|         short_term_ref_pic_set_idx | u(v) |
|       if( long_term_ref_pics_present_flag ) { | |
|         ... | |
|       } | |
|     } | |
|     if( sps_temporal_mvp_enabled_flag ) | |
|       slice_temporal_mvp_enabled_flag | u(1) |
|   } | |
|   if( sample_adaptive_offset_enabled_flag ) { | |
|     slice_sao_luma_flag | u(1) |
|     slice_sao_chroma_flag | u(1) |
|   } | |
|   if( slice_type == P \|\| slice_type == B ) { | |
|     num_ref_idx_active_override_flag | u(1) |
|     if( num_ref_idx_active_override_flag ) { | |

| | Descriptor |
|---|---|
| num_ref_idx_l0_active_minus1 | ue(v) |
|     if( slice_type = = B ) | |
|         num_ref_idx_l1_active_minus1 | ue(v) |
| } | |
|     if( lists_modification_present_flag && NumPocTotalCurr > 1 ) | |
|         ref_pic_lists_modification( ) | |
|     if( slice_type = = B ) | |
|         mvd_l1_zero_flag | u(1) |
|     if( cabac_init_present_flag ) | |
|         cabac_init_flag | u(1) |
|     if( slice_temporal_mvp_enabled_flag ) { | |
|         if( slice_type = = B ) | |
|             collocated_from_l0_flag | u(1) |
|         if( ( collocated_from_l0_flag && num_ref_idx_l0_active_minus1 > 0 ) \|\| | |
|             ( !collocated_from_l0_flag && num_ref_idx_l1_active_minus1 > 0 ) ) | |
|             collocated_ref_idx | ue(v) |
|     } | |
|     if( ( weighted_pred_flag && slice_type = = P ) \|\| | |
|         ( weighted_bipred_flag && slice_type = = B ) ) | |
|         pred_weight_table( ) | |
|     five_minus_max_num_merge_cand | ue(v) |
| } | |
| ... | |
|     byte_alignment( ) | |
| } | |

Semantics can include the following.

cabac_init_present_flag equal to 1 specifies that cabac_init_flag is present in slice headers referring to the picture parameter set (PPS). cabac_init_present_flag equal to 0 specifies that cabac_init_flag is not present in slice headers referring to the PPS.

cabac_init_flag specifies the method for determining the initialization table used in the initialization process for context variables. When cabac_init_flag is not present, it is inferred to be equal to 0.

In Table 9-4 of HEVC, the ctxIdx for which initialization is needed for each of the three initialization types, specified by the variable initType, are listed. Also listed is the table number that includes the values of initValue for the initialization. For P and B slice types, the derivation of initType depends on the value of the cabac_init_flag syntax element. The variable initType may be derived as follows:

```
if( slice_type = = I )
    initType = 0
else if( slice_type = = P )
    initType = cabac_init_flag ? 2 : 1
else
    initType = cabac_init_flag ? 1 : 2
```

For a given probability state, the update may depend on the state index and the value of the encoded symbol identified either as a LPS or a MPS. As a result of the updating process, a new probability state may be derived, which includes a potentially modified LPS probability estimate and, if necessary, a modified MPS value. Basically, the derivation of the transition rules for the LPS probability may be based on the following relation between a given LPS probability $p_{old}$ and its updated counterpart $p_{new}$:

$$p_{new} = \begin{cases} \max(\alpha * p_{old}, p_{62}), & \text{if a } MPS \text{ occurs} \\ \alpha * p_{old} + (1 - \alpha), & \text{if a } LPS \text{ occurs} \end{cases} \quad (4)$$

To reduce the complexity, in CABAC, transition rules may be realized by at most two tables each having 128 entries of 7-bit unsigned integer values. Given a state index i, the new state index after updating may be defined as TransIdxMPS[i] when a MPS values is coded, or TransIdxLPS[i] when a LPS values is coded.

```
TransIdxMPS[ 128 ] =
{
    2, 3, 4, 5, 6, 7, 8, 9, 10, 11, 12, 13, 14, 15, 16, 17,
    18, 19, 20, 21, 22, 23, 24, 25, 26, 27, 28, 29, 30, 31, 32, 33,
    34, 35, 36, 37, 38, 39, 40, 41, 42, 43, 44, 45, 46, 47, 48, 49,
    50, 51, 52, 53, 54, 55, 56, 57, 58, 59, 60, 61, 62, 63, 64, 65,
    66, 67, 68, 69, 70, 71, 72, 73, 74, 75, 76, 77, 78, 79, 80, 81,
    82, 83, 84, 85, 86, 87, 88, 89, 90, 91, 92, 93, 94, 95, 96, 97,
    98, 99, 100, 101, 102, 103, 104, 105, 106, 107, 108, 109, 110, 111, 112, 113,
    114, 115, 116, 117, 118, 119, 120, 121, 122, 123, 124, 125, 124, 125, 126, 127
};
```

```
TransIdxLPS[ 128 ] =
{
    1, 0, 0, 1, 2, 3, 4, 5, 4, 5, 8, 9, 8, 9, 10, 11,
    12, 13, 14, 15, 16, 17, 18, 19, 18, 19, 22, 23, 22, 23, 24, 25,
    26, 27, 26, 27, 30, 31, 30, 31, 32, 33, 32, 33, 36, 37, 36, 37,
    38, 39, 38, 39, 42, 43, 42, 43, 44, 45, 44, 45, 46, 47, 48, 49,
    48, 49, 50, 51, 52, 53, 52, 53, 54, 55, 54, 55, 56, 57, 58, 59,
    58, 59, 60, 61, 60, 61, 60, 61, 62, 63, 64, 65, 64, 65, 66, 67,
    66, 67, 66, 67, 68, 69, 68, 69, 70, 71, 70, 71, 70, 71, 72, 73,
    72, 73, 72, 73, 74, 75, 74, 75, 74, 75, 76, 77, 76, 77, 126, 127
};
```

Arithmetic coding is based on recursive interval division. In one example arithmetic coder, a range, with an initial value of 0 to 1, is divided into two subintervals based on the probability of the bin. The encoded bits provide an offset that, when converted to a binary fraction, selects one of the two subintervals, which indicates the value of the decoded bin. After every decoded bin, the range is updated to equal the selected subinterval, and the interval division process repeats itself. The range and offset have limited bit precision, so renormalization is used whenever the range falls below a certain value to prevent underflow. Renormalization can occur after each bin is decoded.

Arithmetic coding may be done using an estimated probability (context coded) (which is called regular coding mode), or assuming equal probability of 0.5 (bypass coded, which is called bypass mode). For bypass coded bins, the division of the range into subintervals can be done by a shift, whereas a look up table is used for the context coded bins. HEVC uses the same arithmetic coding as H.264/AVC.

Using Table-Based Binary Arithmetic Coding and the flow of regular coding mode are described in further detail below.

Video encoder 20 may output a bitstream that includes encoded video data. For example, the bitstream may include a sequence of bits that forms a representation of coded pictures of the video data and associated data. Thus, the bitstream includes an encoded representation of video data. In some examples, a representation of a coded picture may include encoded representations of blocks. Thus, video encoder 20 may signal, in the bitstream, transform coefficients of a block in an encoded representation of the block. In some instances, video encoder 20 may use one or more syntax elements to signal each transform coefficient of the block.

The bitstream may include a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Certain aspects of this disclosure have been described with respect to extensions of the HEVC standard for purposes of illustration. However, the techniques described in this disclosure may be useful for other video coding processes, including other standard or proprietary video coding processes not yet developed.

Figure 3:
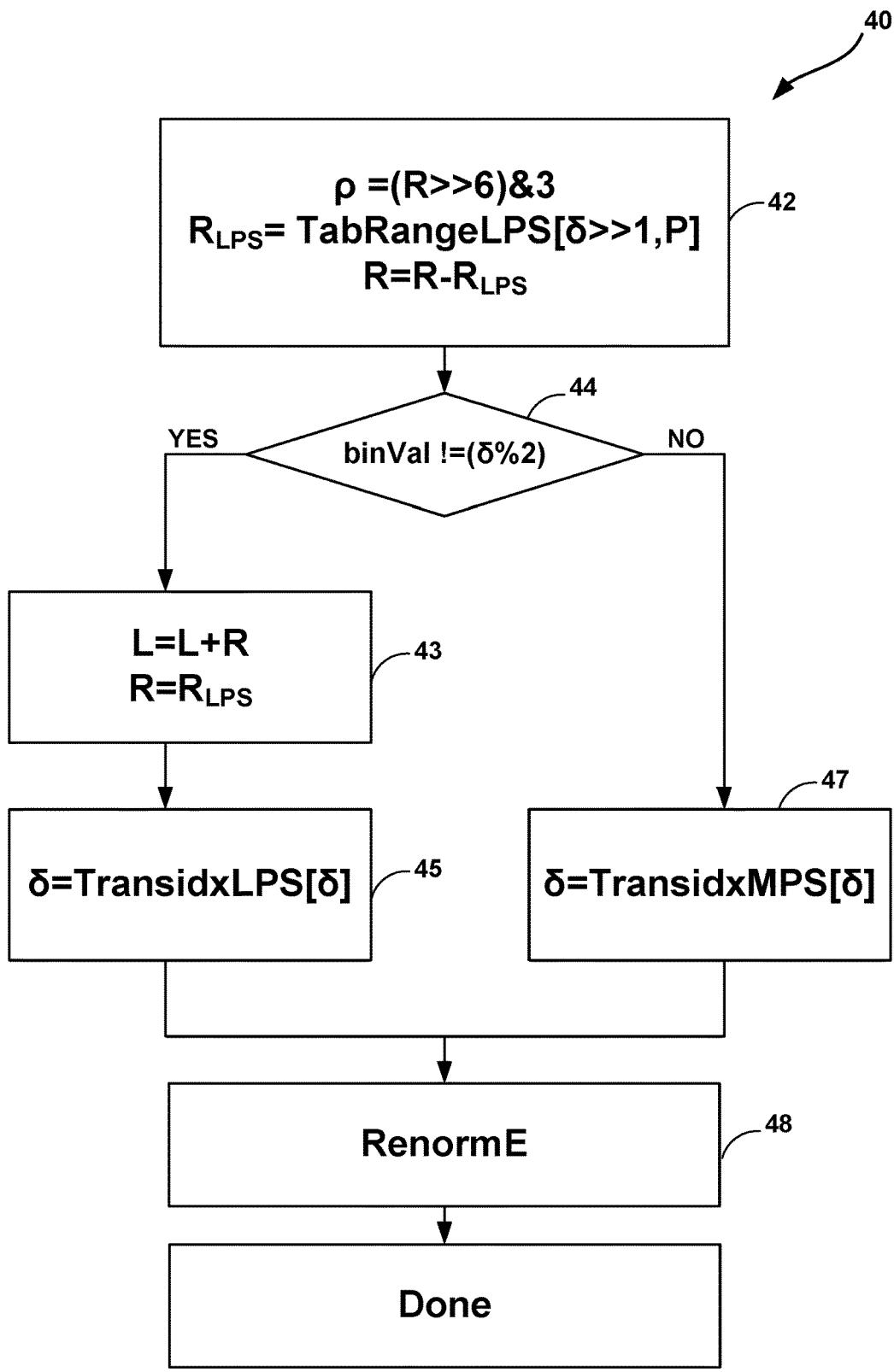
FIG. 3 is a flowchart illustrating an example process for table-based binary arithmetic coding.

FIG. 3 is a flowchart illustrating an example process 40 for table-based binary arithmetic coding. Specifically, FIG. 3 includes a flow diagram of the binary arithmetic encoding process including the updating process of probability estimation for a single bin value (binVal) using the regular coding mode.

FIG. 3 illustrates a binary arithmetic encoding process for a given bin value binVal using the regular coding mode. The internal state of the arithmetic encoding engine may be characterized by two quantities: the current interval range R and the base (lower endpoint) L of the current code interval. Note, however, that the precision to store these registers in the CABAC engine (both in regular and bypass mode) may be reduced up to 9 and 10 bits, respectively. Encoding of the given binary value binVal observed in a context with probability state index δ and value of MPS (δ% 2) may be performed in a sequence of four elementary steps as follows.

In step 42, the current interval is subdivided according to the given probability estimates. This interval subdivision process involves three operations as shown in step 42 of the flow diagram in FIG. 3. First, the current interval range R is approximated by a quantized value $Q$ (R) using an equi-partition of the whole range $2^8 \leq R \leq 2^9$ into four cells. But instead of using the corresponding representative quantized range values $Q_0$, $Q_1$, $Q_2$, and $Q_3$ explicitly in the CABAC engine, a video coder may be configured to compute a quantizer index ρ, which may be efficiently computed by a combination of a shift and bit-masking operation, e.g., $$\rho = (R >> 6) \& 3 \qquad (5)$$

Then, this index ρ and the probability state index δ are used as entries in a 2-D table TabRangeLPS to determine the (approximate) LPS related subinterval range $R_{LPS}$, as shown in FIG. 3. In some examples, the table TabRangeLPS may include all 64×4 pre-computed product values for $p_\sigma \cdot Q_\rho$ for $0 \leq (\delta >> 1) \leq 63$ and $0 \leq \rho \leq 3$ in 8-bit precision.

Given the dual subinterval range for the MPS, the subinterval corresponding to the given bin value binVal is chosen in step 44 of the encoding process. If binVal is equal to the MPS value ("NO" of step 44 in FIG. 3), the lower subinterval is chosen so that L is unchanged and the process continues to step 47. If binVal is not equal to the MPS value ("YES" of step 44 in FIG. 3), the upper subinterval with range equal to $R_{LPS}$ is selected (step 43).

Steps 45 and 47 may represent the regular arithmetic encoding process to update of the probability states. Step 48 includes the renormalization of the registers L and R ("RenormE" box in FIG. 3).

The example 2-D table TabRangeLPS can be defined as follows:

```
TabRangeLPS[64][4] =
{
    { 128, 176, 208, 240 },
    { 128, 167, 197, 227 },
    { 128, 158, 187, 216 },
    { 123, 150, 178, 205 },
    { 116, 142, 169, 195 },
    { 111, 135, 160, 185 },
    { 105, 128, 152, 175 },
    { 100, 122, 144, 166 },
    { 95, 116, 137, 158 },
    { 90, 110, 130, 150 },
    { 85, 104, 123, 142 },
    { 81, 99, 117, 135 },
    { 77, 94, 111, 128 },
    { 73, 89, 105, 122 },
    { 69, 85, 100, 116 },
    { 66, 80, 95, 110 },
    { 62, 76, 90, 104 },
    { 59, 72, 86, 99 },
    { 56, 69, 81, 94 },
    { 53, 65, 77, 89 },
    { 51, 62, 73, 85 },
    { 48, 59, 69, 80 },
    { 46, 56, 66, 76 },
    { 43, 53, 63, 72 },
    { 41, 50, 59, 69 },
    { 39, 48, 56, 65 },
    { 37, 45, 54, 62 },
    { 35, 43, 51, 59 },
    { 33, 41, 48, 56 },
    { 32, 39, 46, 53 },
    { 30, 37, 43, 50 },
    { 29, 35, 41, 48 },
    { 27, 33, 39, 45 },
    { 26, 31, 37, 43 },
    { 24, 30, 35, 41 },
    { 23, 28, 33, 39 },
    { 22, 27, 32, 37 },
    { 21, 26, 30, 35 },
    { 20, 24, 29, 33 },
    { 19, 23, 27, 31 },
    { 18, 22, 26, 30 },
    { 17, 21, 25, 28 },
    { 16, 20, 23, 27 },
    { 15, 19, 22, 25 },
    { 14, 18, 21, 24 },
    { 14, 17, 20, 23 },
    { 13, 16, 19, 22 },
    { 12, 15, 18, 21 },
    { 12, 14, 17, 20 },
    { 11, 14, 16, 19 },
    { 11, 13, 15, 18 },
    { 10, 12, 15, 17 },
    { 10, 12, 14, 16 },
    { 9, 11, 13, 15 },
    { 9, 11, 12, 14 },
    { 8, 10, 12, 14 },
    { 8, 9, 11, 13 },
    { 7, 9, 11, 12 },
    { 7, 9, 10, 12 },
    { 7, 8, 10, 11 },
    { 6, 8, 9, 11 },
    { 6, 7, 9, 10 },
    { 6, 7, 8, 9 },
    { 2, 2, 2, 2 }
};
```

Figure 4:
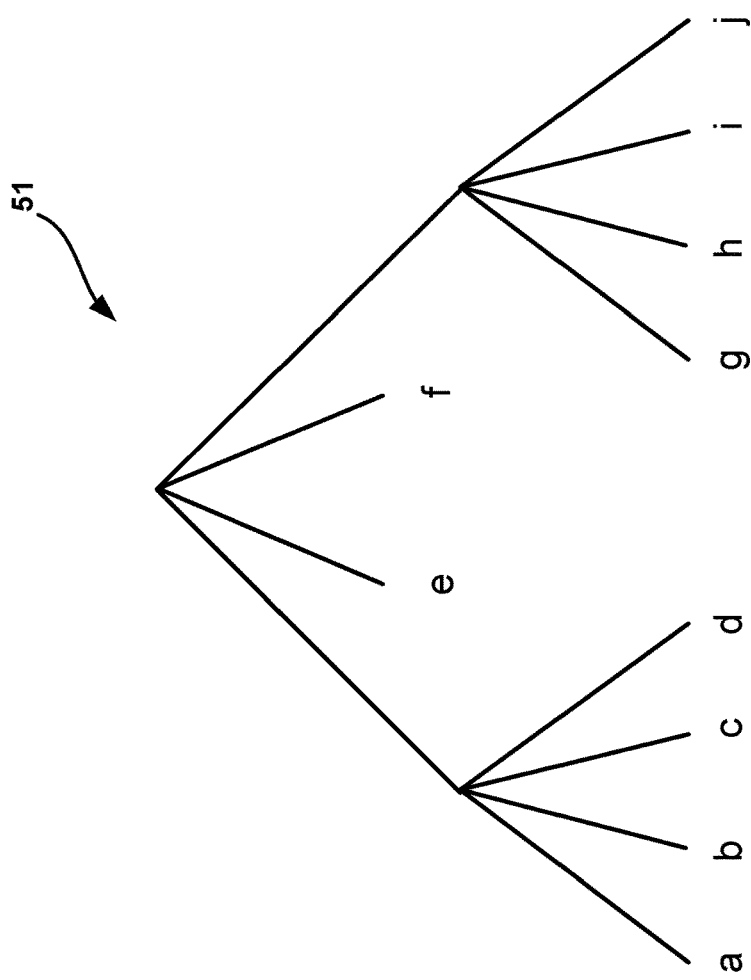
FIG. 4 is an illustration on the transform scheme based on a residual.
Figure 4:
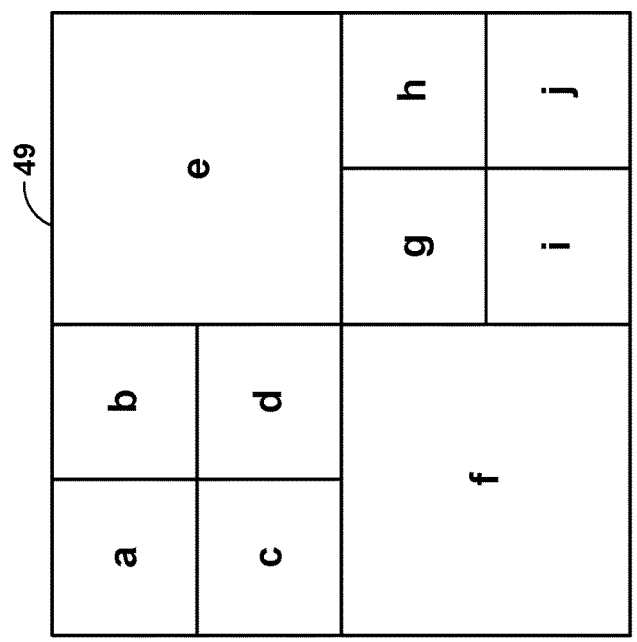

FIG. 4 shows an example where a CU 49 includes 10 TUs, labeled with the letters a to j, and the corresponding block partitioning 51. A video encoder may apply the concepts illustrated in FIG. 4 to generate video data to be entropy encoded in a bitstream using a context initialization. In some examples, a video decoder may apply the concepts illustrated in FIG. 4 to entropy decode video data in a bitstream using a context initialization. Each node of the residual quad tree (RQT) is actually a transform unit (TU). The individual TUs are processed in depth-first tree traversal order, which is illustrated in the figure as alphabetical order, which follows a recursive Z-scan with depth-first traversal. The quadtree approach enables the adaptation of the transform to the varying space-frequency characteristics of the residual signal. Typically, larger transform block sizes, which have larger spatial support, provide better frequency resolution. However, smaller transform block sizes, which have smaller spatial support, provide better spatial resolution. The trade-off between the two, spatial and frequency resolutions, is chosen by video encoder mode 20 decision, for example based on rate-distortion optimization technique. The rate-distortion optimization technique calculates a weighted sum of coding bits and reconstruction distortion, i.e., the rate-distortion cost, for each coding mode (e.g., a specific RQT splitting structure), and select the coding mode with least rate-distortion cost as the best mode.

FIG. 4 is an illustration on the transform scheme based on a residual quadtree. Further details regarding a transform scheme based on a residual quadtree in HEVC may be described at http://www.hhi.fraunhofer.de/fields-of-competence/image-processing/researchgroups/image-video-coding/hevc-high-efficiency-video-coding/transform-coding-using-the-residual-quadtree-rqt.html.

Three parameters may be defined in the RQT: the maximum depth of the tree, the minimum allowed transform size and the maximum allowed transform size. In HEVC, the minimum and maximum transform sizes may vary within the range from 4×4 to 32×32 samples, which correspond to the supported block transforms mentioned in the previous paragraph. The maximum allowed depth of the RQT may restrict the number of TUs. A maximum depth equal to zero means that a CTU may not be split any further if each included TU reaches the maximum allowed transform size, e.g., 32×32.

All these parameters interact and influence the RQT structure. Consider a case, in which the root CTU size is 64×64, the maximum depth is equal to zero and the maximum transform size is equal to 32×32. In this case, the CTU may to be partitioned at least once, since otherwise it would lead to a 64×64 TB, which is not allowed. The RQT parameters, e.g., maximum RQT depth, minimum and maximum transform size, may be transmitted in the bitstream at the sequence parameter set level. Regarding the RQT depth, different values can be specified and signaled for intra and inter coded CUs.

The quadtree transform may be applied for both Intra and Inter residual blocks. Typically, the DCT-II transform of the same size of the current residual quadtree partition is applied for a residual block. However, if the current residual quadtree block is 4×4 and is generated by Intra prediction, the above 4×4 DST-VII transform is applied.

In HEVC, larger size transforms, e.g., 64×64 transform are not adopted mainly due to its limited benefit considering and relatively high complexity for relatively smaller resolution videos.

Figure 5:
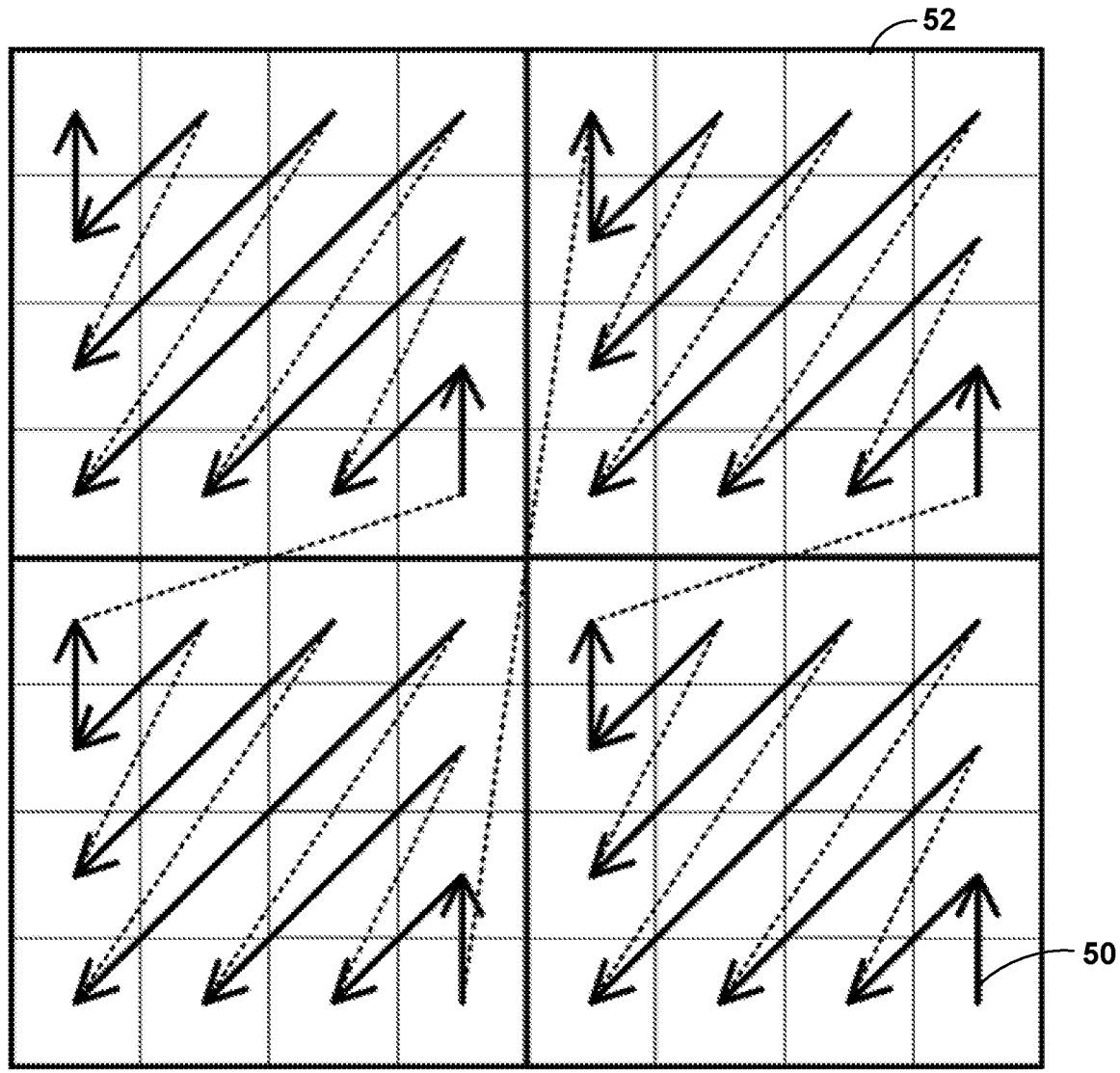
FIG. 5 is an illustration of a coefficient scan based on coefficient groups (CGs).

Regardless of the TU size, the residual of the transform unit may be coded with non-overlapped coefficient groups (CG), each contains the coefficients of a 4×4 block of a TU. For example, a 32×32 TU has totally 64 CGs, and a 16×16 TU has totally 16 CGs. The CGs inside a TU are coded according to a certain pre-defined scan order. When coding each CG, a video coder may scan and code the coefficients inside the current CG according to a certain pre-defined scan order for 4×4 block. FIG. 5 illustrates the coefficient scan 50 for an 8×8 TU 52 containing 4 CGs. Residual coding syntax for HEVC is as follows.

|  | Descriptor |
|---|---|
| residual_coding( x0, y0, log2TrafoSize, cIdx ) { | |
|   if( transform_skip_enabled_flag | |
| && !cu_transquant_bypass_flag && | |
|     ( log2TrafoSize = = 2 ) ) | |
|       transform_skip_flag[ x0 ][ y0 ][ cIdx ] | ae(v) |
|   last_sig_coeff_x_prefix | ae(v) |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   lastScanPos = 16 | |
|   lastSubBlock = ( 1 << ( log2TrafoSize − 2 ) ) * ( 1 << ( | |
|                               log2TrafoSize − 2 ) ) − 1 | |
|   do { | |
|     if( lastScanPos = = 0 ) { | |
|       lastScanPos = 16 | |
|       lastSubBlock− − | |
|     } | |
|     lastScanPos− − | |
|     xS = | |
|                                 ScanOrder[ log2TrafoSize − 2 ][ scanIdx ][ lastSubBlock ][ 0 ] | |
|     yS = | |
|                                 ScanOrder[ log2TrafoSize − 2 ][ scanIdx ][ lastSubBlock ][ 1 ] | |
|     xC = ( xS << 2 ) + | |
|                                 ScanOrder[ 2 ][ scanIdx ][ lastScanPos ][ 0 ] | |
|     yC = ( yS << 2 ) + | |
|                                 ScanOrder[ 2 ][ scanIdx ][ lastScanPos ][ 1 ] | |
|   } while( ( xC != LastSignificantCoeffX ) | | ( yC != | |
|                     LastSignificantCoeffY ) ) | |
|   for( i = lastSubBlock; i >= 0; i− − ) { | |
|     xS = ScanOrder[ log2TrafoSize − 2 ][ scanIdx ][ i ][ 0 ] | |
|     yS = ScanOrder[ log2TrafoSize − 2 ][ scanIdx ][ i ][ 1 ] | |
|     inferSbDcSigCoeffFlag = 0 | |
|     if( ( i < lastSubBlock) && ( i > 0 ) ) { | |
|       coded_sub_block_flag[ xS ][ yS ] | ae(v) |
|       inferSbDcSigCoeffFlag = 1 | |
|     } | |
|     for( n = ( i = = lastSubBlock ) ? lastScanPos − 1 : 15; n >= 0; n− − ) { | |
|       xC = ( xS << 2 ) + ScanOrder[ 2 ][ scanIdx ][ n ][ 0 ] | |
|       yC = ( yS << 2 ) + ScanOrder[ 2 ][ scanIdx ][ n ][ 1 ] | |
|       if( coded_sub_block_flag[ xS ][ yS ] && (n > 0 | | !inferSbDcSigCoeffFlag ) ) { | |
|         sig_coeff_flag[ xC ][ yC ] | ae(v) |
|         if( sig_coeff_flag[ xC ][ yC ] ) | |
|           inferSbDcSigCoeffFlag = 0 | |
|       } | |
|     } | |
|     firstSigScanPos = 16 | |
|     lastSigScanPos = −1 | |
|     numGreater1Flag = 0 | |
|     lastGreater1ScanPos = −1 | |
|     for( n = 15; n >= 0; n− − ) { | |
|       xC = ( xS << 2 ) + ScanOrder[ 2 ][ scanIdx ][ n ][ 0 ] | |
|       yC = ( yS << 2 ) + ScanOrder[ 2 ][ scanIdx ][ n ][ 1 ] | |
|       if( sig_coeff_flag[ xC ][ yC ] ) { | |
|         if( numGreater1Flag < 8 ) { | |
|           coeff_abs_level_greater1_flag[ n ] | ae(v) |
|           numGreater1Flag++ | |
|           if( coeff_abs_level_greater1_flag[ n ] && | |
| lastGreater1ScanPos == −1 ) | |

|  | Descriptor |
|---|---|
| ``` 
                    lastGreater1ScanPos = n
                }
            if( lastSigScanPos = = −1 )
                lastSigScanPos = n
            firstSigScanPos = n
            }
        }
        signHidden = ( lastSigScanPos − firstSigScanPos > 3 &&
!cu_transquant_bypass_flag )
        if( lastGreater1ScanPos != −1 )
            coeff_abs_level_greater2_flag[ lastGreater1ScanPos ]
        for( n = 15; n >= 0; n− − ) {
            xC = ( xS << 2 ) + ScanOrder[ 2 ][ scanIdx ][ n ][ 0 ]
            yC = ( yS << 2 ) + ScanOrder[ 2 ][ scanIdx ][ n ][ 1 ]
            if( sig_coeff_flag[ xC ][ yC ] &&
                ( !sign_data_hiding_enabled_flag | | !signHidden | | (
n != firstSigScanPos ) ) )
                coeff_sign_flag[ n ]
        }
        numSigCoeff = 0
        sumAbsLevel = 0
        for( n = 15; n >= 0; n−− ) {
            xC = ( xS << 2 ) + ScanOrder[ 2 ][ scanIdx ][ n ][ 0 ]
            yC = ( yS << 2 ) + ScanOrder[ 2 ][ scanIdx ][ n ][ 1 ]
            if( sig_coeff_flag[ xC ][ yC ] ) {
                baseLevel = 1 + coeff_abs_level_greater1_flag[ n ] +
                            coeff_abs_level_greater2_flag[ n ]
                if( baseLevel = = ( ( numSigCoeff < 8 ) ?
                                    ( (n = = lastGreater1ScanPos) ? 3 : 2
) : 1 ) )
                    coeff_abs_level_remaining[ n ]
                TransCoeffLevel[ x0 ][ y0 ][ cIdx ][ xC ][ yC ] =
                    ( coeff_abs_level_remaining[ n ] + baseLevel ) * ( 1
− 2 * coeff_sign_flag[ n ] )
                if( sign_data_hiding_enabled_flag && signHidden )
{
                    sumAbsLevel += ( coeff_abs_level_remaining[ n ]
+ baseLevel )
                    if( ( n = = firstSigScanPos ) && ( (
sumAbsLevel % 2 ) = = 1 ) )
                        TransCoeffLevel[ x0 ][ y0 ][ cIdx ][ xC ][ yC ] =
    −TransCoeffLevel[ x0 ][ y0 ][ cIdx ][ xC ][ yC ]
                }
                numSigCoeff++
            }
        }
    }
}
``` | ae(v)<br><br><br><br><br><br>ae(v)<br><br><br><br><br><br><br>ae(v) |

Example semantics in HEVC are discussed below.

last_sig_coeff_x_prefix specifies the prefix of the column position of the last significant coefficient in scanning order within a transform block. The values of last_sig_coeff_x_prefix shall be in the range of 0 to (log 2TrafoSize<<1)−1, inclusive.

last_sig_coeff_y_prefix specifies the prefix of the row position of the last significant coefficient in scanning order within a transform block. The values of last_sig_coeff_y_prefix shall be in the range of 0 to (log 2TrafoSize<<1)−1, inclusive.

last_sig_coeff_x_suffix specifies the suffix of the column position of the last significant coefficient in scanning order within a transform block. The values of last_sig_coeff_x_suffix shall be in the range of 0 to (1<<((last_sig_coeff_x_prefix>>1)−1))−1, inclusive.

The column position of the last significant coefficient in scanning order within a transform block LastSignificantCoeffX is derived as follows:

If last_sig_coeff_x_suffix is not present, the following applies:

LastSignificantCoeffX=last_sig_coeff_x_prefix

Otherwise (last_sig_coeff_x_suffix is present), the following applies:

LastSignificantCoeffX=(1<<((last_sig_coeff_x_prefix>>1)−1))*(2+(last_sig_coeff_x_prefix & 1))+last_sig_coeff_x_suffix last_sig_coeff_y_suffix specifies the suffix of the row position of the last significant coefficient in scanning order within a transform block. The values of last_sig_coeff_y_suffix shall be in the range of 0 to (1<<((last_sig_coeff_y_prefix>>1)−1))−1, inclusive.

The row position of the last significant coefficient in scanning order within a transform block LastSignificantCoeffY is derived as follows:

If last_sig_coeff_y_suffix is not present, the following applies:

LastSignificantCoeffY=last_sig_coeff_y_prefix

Otherwise (last_sig_coeff_y_suffix is present), the following applies:

LastSignificantCoeffY=(1<<((last_sig_coeff_y_prefix>>1)−1))*(2+(last_sig_coeff_y_prefix & 1))+last_sig_coeff_y_suffix When scanIdx is equal to 2, the coordinates are swapped as follows: (LastSignificantCoeffX, LastSignificantCoeffY)= Swap(LastSignificantCoeffX, LastSignificantCoeffY)

When deriving a position coded using the row position of the last significant coefficient in scanning order and using the coefficient scanning order of the CGs, the video encoder may signal one flag for the CGs except the last CG (in scanning order). The flag for the last CG may indicate whether the last CG contains non-zero coefficients.

When coding whether one CG has non-zero coefficients, e.g., the CG flag (coded_sub_block_flag in the HEVC specification), a video coder may use the information of neighboring CGs to build the context. To be more specific, the context selection for coding the CG flag may be defined as:

(Right CG available && Flag of right CG is equal to 1)||(below CG available && Flag of below CG is equal to 1)

Here, the right and below CG are the two neighbouring CGs close to current CG. For example, FIG. 5, when coding the top-left 4×4 block, the right CG is defined as the top-right 4×4 block and the below CG is defined as the left-below 4×4 block.

Note that chroma and luma may use different sets of context models but may apply similar processes to select one context model.

Details of the derivation of context index increment, which may be used to decode video data entropy decoded in a bitstream or to encode video data to be entropy encoded in a bitstream, could be found in 9.3.4.2.4 of HEVC specification, which may be accessed at JCTVC-L1003 v34, http://phenix.it-sudparis.eu/jct/doc_end_user/documents/12_Geneva/wg11/JCTVC-L1003-v34.zip.

Transform coefficient coding within one CG is discussed below. A video decoder may use transform coefficient coding within one CG to decode video data entropy decoded in a bitstream. In some examples, a video encoder may use transform coefficient coding within one CG to encode video data to be entropy encoded in a bitstream, Exemplary details of the selection of the context index increment are defined in 9.3.4.2.5, 9.3.4.2.6, and 9.3.4.2.7 of HEVC specification, which may be accessed at JCTVC-L1003_v34, http://phenix.it-sudparis.eu/jct/doc_end_user/documents/12 Geneva/wg11/JCTVC-L1003-v34.zip.

For those CGs that may contain non-zero coefficients, significant flags (significant flag), absolute values of coefficients (including coeff_abs_level_greater_1_flag, coeff_abs_level_greater_2_flag and coeff_abs_level_remaining) and sign information (coeff_sign_flag) may be further coded for each coefficient according to the predefined 4×4 coefficient scan order. The coding of transform coefficient levels may be separated into multiple scan passes.

In the first pass, a video coder may code all the first bins (or the bin index 0, bin0) of transform coefficients at each position within one CG except that the video coder may derived that the specific transform coefficient is equal to 0.

The variable sigCtx depends on the current location relative to the top-left position of current TU, the colour component index cIdx, the transform block size, and previously decoded bins of the syntax element coded_sub_block_flag. A video coder may apply different rules depending on the TU size.

A second pass of the second bin coding is discussed in the following.

A video coder may apply the coding of coeff_abs_level_greater1_flags in this pass. The context modeling is dependent on color component index, the current sub-block scan index, and the current coefficient scan index within the current sub-block.

A third pass of the third bin coding is discussed in the following.

A video coder may apply the coding of coeff_abs_level_greater_2_flags in the third pass. The context modeling is similar to that used by coeff_abs_level_greater1_flags.

Note that in order to improve throughput, the second and third passes may not process all the coefficients in a CG. The first eight coeff_abs_level_greater1_flags in a CG may be coded in regular mode. After that, a video coder may leave the values to be coded in bypass mode in the fifth pass by the syntax coeff_abs_level_remaining. Similarly, a video coder may code only the coeff_abs_level_greater_2_flags for the first coefficient in a CG with magnitude larger than 1. The rest of coefficients with magnitude larger than 1 of the CG may use coeff_abs_level_remaining to code the value. This technique limits the number of regular bins for coefficient levels to a maximum of 9 per CG: 8 for the coeff_abs_level_greater1_flags and 1 for coeff_abs_level_greater_2_flags.

A fourth pass of sign information is discussed in the following.

In HEVC, a video coder may code the sign of each nonzero coefficient in the fourth scan pass in bypass mode. For each CG, and depending on a criterion, encoding the sign of the last nonzero coefficient (in reverse scan order) may be omitted when using sign data hiding (SDH). Instead, a video coder may embed the sign value in the parity of the sum of the levels of the CG using a predefined convention: even corresponds to "+" and odd to "−." The criterion to use SDH is the distance in scan order between the first and the last nonzero coefficients of the CG. If this distance is equal or larger than 4, SDH is used. This value of 4 was chosen because it may provide the largest gain on HEVC test sequences.

A last pass of remaining bins is discussed in the following.

A video coder may code the remaining bins in a further scan pass. Let the baseLevel of a coefficient be defined as follows.

$$baseLevel = significant\_flag + coeff\_abs\_level\_greater1\_flag + coeff\_abs\_level\_greater2\_flag \quad (6)$$

where a flag has a value of 0 or 1 and is inferred to be 0 if not present. Then, the absolute value of the coefficient is as follows.

$$absCoeffLevel = baseLevel + coeff\_abs\_level\_remaining \quad (7)$$

The Rice parameter may be set to 0 at the beginning of each CG and it is conditionally updated depending on the previous value of the parameter and the current absolute level as follows:

$$\text{if } absCoeffLevel > 3 \times 2m, m = \min(4, m+1) \quad (8)$$

A video coder may code the syntax element coeff_abs_level_remaining in bypass mode. In addition, a video coder may apply an HEVC employing Golomb—Rice codes for small values and switches to an Exp-Golomb code for larger values. The transition point between the codes may be when the unary code length equals 4. The parameter update process may allow the binarization to adapt to the coefficient statistics when large values are observed in the distribution.

inter_pred_idc specifies whether list0, list1, or bi-prediction is used for the current prediction unit. The syntax element has up to two bins, both of which are CABAC context coded. The binairzed bin string is defined as follows in Table 2.

TABLE 2

| Value of inter_pred_idc | Bin string (nPbW + nPbH) != 12 | Bin string (nPbW + nPbH) != 12 |
|---|---|---|
| 0 | 00 | 00 |
| 1 | 01 | 01 |
| 2 | 1 | 1 | wherein nPbW and nPbH represent the current luma prediction block width and height, respectively.

For each inter-coded slice, e.g., P slice or B slice, a video coder may select the context based on the following rule. If (nPbW+nPbH) is unequal to 12, the video coderm may code the first bin using four contexts and may code the second bin with one context. The context selection of the first bin may be according the current CU depth. In HEVC, CU depth is in the range of 0 to 3, inclusively.

In JCTVC-F254, which may be found at T. Nguyen, D. Marpe, T. Wiegand, "Non-CE11: Proposed Cleanup for Transform Coefficient Coding", JCTVC-H0228, 8th Meeting: San Jose, Calif., USA, 1-10 Feb. 2012 and JCTV-G764, a new arithmetic coder is proposed. For example, every probability represented as an integer number from 1 to 32767. As such, all calculations may be carried out with 16 bits precision. Instead of look-up tables (TransIdxMPS and TransIdxLPS) and exponential mesh for each probability, which are utilized in AVC CABAC, a uniform mesh and an explicit calculation with multiplication free formula for probability update may be used in JCTVC-F254 and JCTV-G764.

In some examples, a video coder may be configured to represent probability $p_i$ by a probability index, which is an integer number $P_i$ from 0 to $2^k$ (with k equal to 15 for example), that is $$p_i = P_i/2^k \quad (9)$$

A video coder may apply the following formula for the probability update in modern arithmetic codecs, more details of which may be found at D. Marpe, H. Schwarz, and T. Wiegand, "Context-based adaptive binary arithmetic coding in the H.264/AVC video compression standard," IEEE Trans. Circuits Syst. Video Technol., vol. 13, no. 7, pp. 620-636, July 2003.

$$p_{new} = \alpha y + (1-\alpha) p_{old}. \quad (10)$$

Here y is equal to "zero" if the current symbol matches with most probable symbol (MPS) otherwise y is equal to "one". This formula provides estimating value for probability of least probable symbol (LPS). The parameter $N=1/\alpha$ is a measure for the number of previously encoded bins which have significant influence on the current up-date ("window size").

If we assume $\alpha$ is power of two ($\alpha=\frac{1}{2}^M$, M is a positive integer), and given the pi in equation (9) as the input $p_{old}$, the updated probability index could be rewritten as:

$$P_i = ((2^k) >> M) + P_i - (P_i >> M) \quad (11)$$

In an exemplary one-probability update model, M may be fixed for all the context models and only one register is used to record the updated probabilities. In some examples, M may be set equal to 6. That is, the window size may be equal to 64. The probability update process could be represented by:

$$P_{new} = ((2^k) >> 6) + P_i - (P_i >> 6) \quad (12)$$

In some examples, a video coder may use several probability estimations (instead of only one) with different a and combine them as weighted average for next bin probability prediction.

$$p_{i\ new} = \alpha_i y + (1-\alpha_i) p_{i\ old} \quad (13)$$

$$p_{new} = \Sigma \beta_i p_{i\ new}. \quad (14)$$

Calculations in formula (13) for each probabilities $p_i$ are independent.

Figure 6:
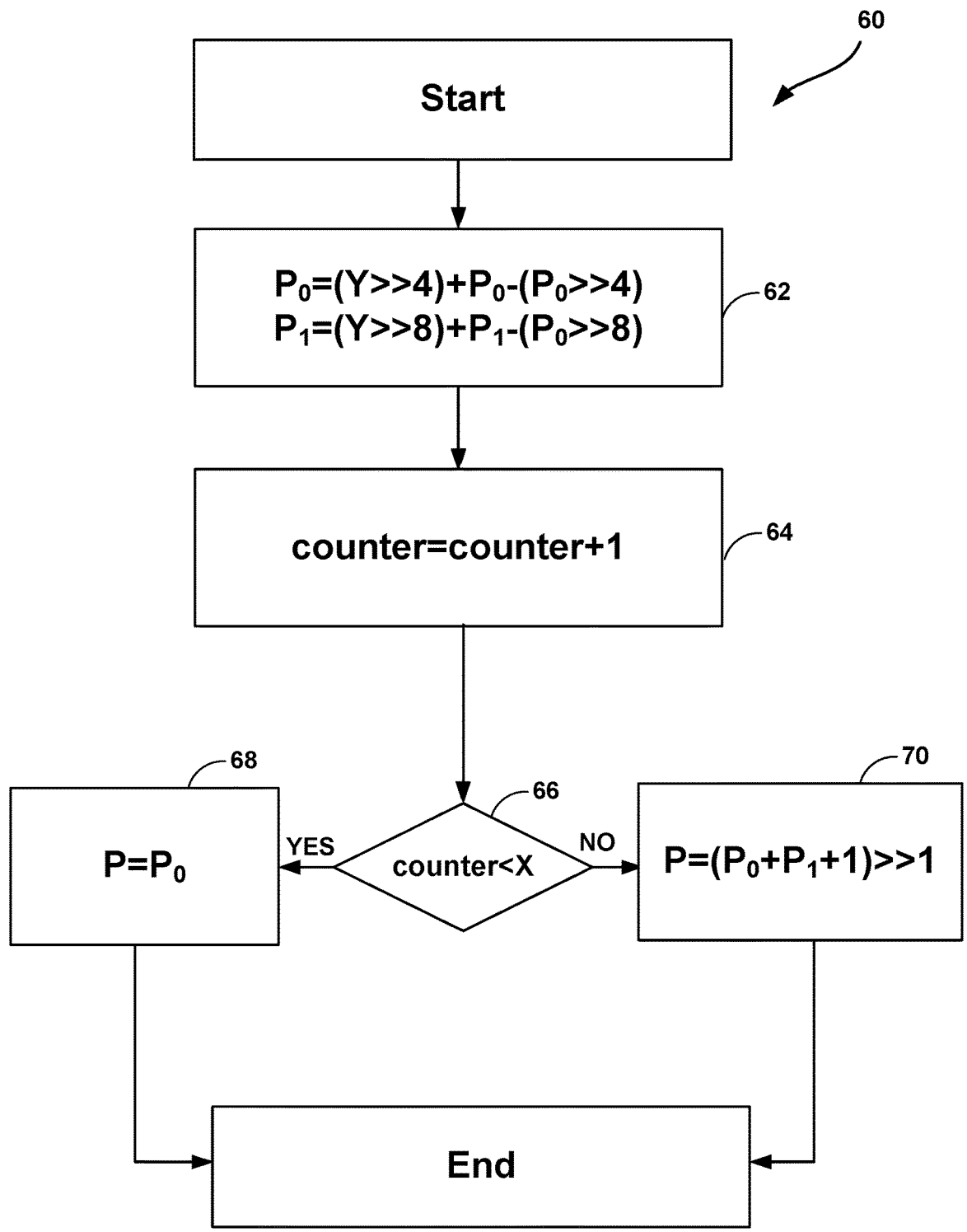
FIG. 6 is an illustration of a multi-parameter probability up-date diagram.

FIG. 6 is an illustration of a multi-parameter probability up-date diagram (two probabilities model). In the process 60 of FIG. 6, video encoder 20 and/or video decoder 30 (also referred to herein as simply, "video coder") may calculate two probabilities according to equations 15 and 16 as follows (62).

In example techniques, the linear combination for probability estimation may include two summands corresponding $N_0 = 16$ and $N_1 = 256$ ($N_i = 1/\alpha_i$):

$$P_0 = (Y >> 4) + P_0 - (P_0 >> 4) \quad (15)$$

$$P_1 = (Y >> 8) + P_1 - (P_0 >> 8) \quad (16)$$

$$P = (P_0 + P_1 + 1) >> 1 \quad (17)$$

Here $Y=2^{15}$ if last coding bin is "1" and Y=0 if last coding bin is "0", and ">>M" is right arithmetic shift for M bits.

For a short transition period, short distance prediction (e.g., smaller window size) with fast updating speed can be used. But after stabilization near the optimal value, a two-probability update model may be more accurate for a majority of context models. A video coder may use a counter of updates since last initialization. After each up-date, a video coder can increase the counter by one (64). A video coder may determine if the counter exceeds threshold X (e.g., 50) (66). Until the counter exceeds some threshold ("YES" of 66), a video coder may use only a short "window size" model (equation 15) (68). When the counter reaches the threshold ("NO" of 66), the video coder may switch to a more accurate two-probability update model (equation 17) (70). The range calculation process may be performed with a 512×64 lookup table.

A video coder (e.g., video encoder 20 and video decoder 30) may apply different context initialization techniques. Two-parameters (denoted by asCtxInit[0] and asCtxInit[1], respectively) may be pre-defined for one context model.

Int iQPreper=I slice? 37:40;
Int c=asCtxInit[0]+asCtxInit[1]*(iQp-iQPreper);
iP0=min(max(1, c), 32767);

For a one-probability update model, a video coder may represent the context model by iP0 with 15-bit precision. For a two-probabilities update model, the video coder may represent the context model further using variable iP1 that may be initially set equal to iP0 and a counter of how many bins have been coded.

A video coder may store both asCtxInit[0] and asCtxInit[1] in 15-bit. A video coder may, additionally or alternatively, be configured to perform techniques according to this disclosure for context initialization, as discussed below.

A video coder may inherit the context information after coding or decoding one block (or more than one block) located in a previously coded picture as the initialized context information for coding a current slice. In some examples, a video coder may apply techniques for inheriting the context information to P and/or B slices. In some examples, a video coder may pre-define and fix the position of 'one block' for one whole sequence. In some examples, a video coder may denote the largest coding unit size (LCU) by N×N, and the picture width by W and picture height by H. The number of LCUs within one LCU row, denoted by PicWidthInCtbsY, is equal to Ceil(W÷N), and the number of LCU rows, denoted by PicHeightInCtbsY, is equal to Ceil (H÷N) wherein the function Ceil (x) represents the smallest integer greater than or equal to x.

In some examples, a video coder may define the position as: TargetCUAddr=(PicWidthInCtbsY*PicHeightInCtbsY)/2+PicWidthInCtbsY/2. Furthermore, when TargetCUAddr is equal to or larger than (PicWidthInCtbsY*PicHeightInCtbsY), (e.g., PicHeightInCtbsY is equal to 1), a video coder may reset TargetCUAddr to (PicWidthInCtbsY*PicHeightInCtbsY−1), which corresponds to the last LCU.

In some examples, a video coder may define the position as the last LCU of the previously coded picture, or the center LCU within one frame (i.e., PicWidthInCtbsY*PicHeightInCtbsY/2), or the last LCU of the center LCU row (i.e., PicWidthInCtbsY*(PicHeightInCtbsY/2)−1), or the last LCU of the k-th LCU row (e.g., k is equal to 1).

In some examples, a video coder may define the position as the last LCU of the first slice in the previously coded picture. In some examples, a video coder may define the position as the central LCU of the first slice in the previously coded picture. Supposing the numLCUinSlice represent the LCU number in the first slice, a video coder may define the position as: TargetCUAddr=numLCUinSlice/2.

Different resolutions may have different definitions of the position of the coding block. In some examples, a video coder may signal the position of 'one block' in a SPS, or PPS, or slice header. In some examples, a video coder may signal the indication of 'a previously coded picture', such as reference picture index, picture order counter (POC) difference, in a slice header/picture parameter set. In some examples, a video coder may define 'a previously coded picture' as the picture which is coded/decoded just before the current picture. In some examples, a video coder may define 'a previously coded picture' as the picture which is the encoded/decoded picture before the current picture and the first slice in the previous picture has the same slice type to the current slice. In some examples, a video coder may define 'a previously coded picture' as the picture which is the encoded/decoded picture before the current picture and the first slice in the previous picture has the same initialized quantization parameters to the current slice. In some examples, a video coder may define 'a previously coded picture' as the picture containing a previously coded slice which has the same slice type, or both the same slice type and quantization parameter, or both the same slice type and temporal layer, as the current slice and/or the same initialized quantization parameters. In some examples, 'a previously coded picture' may be a picture that is present in the decoded picture buffer (DPB) and a video coder may use the previously coded (e.g., encoded, decoded, etc.) picture for the current picture as a reference picture, in particular, as in an HEVC based platform, the previous slice may belong to a picture in reference picture set (RPS), or even a picture in one of the following subsets of the RPS: RefPicSetStCurrBefore, RefPicSetStCurrAfter, and RefPicSetLtCurr.

If all the pictures coded after one Intra picture in display order do not have the same slice types and same initialized quantization parameters, a video coder may disable the inheritance of context information. In this case, a video coder may apply an initialization technique using fixed context information. A video coder may apply techniques described herein for context initialization only to specific context models. Alternatively, or additionally, the position of 'one block' may be different for different context models. The above techniques may be combined. When cabac_init_present_flag is further enabled, the slice included in the 'previously coded picture' should have the same type as current slice. That is, for example, a video coder may not use a signaled cabac_init_flag. Alternatively, or additionally, a video coder may modify the slice type of current slice based on cabac_init_flag and then select the 'previously coded picture'.

Context initialization with temporal prediction (CITP) in JEM is discussed in the following. As used herein, temporal prediction may refer to inter prediction, motion compensation, or another temporal prediction. A video coder may apply CITP in JEM using techniques described herein to store a single probability state for (consecutive) quantization parameters.

Suppose a video coder codes (e.g., encode, decode, etc.) one picture coded with one slice, a video coder may apply the following rules to derive the initialized states of context models. If the conditions are not satisfied, a video coder may use the original context initialization techniques (e.g., from the fixed initialization tables).

The previously coded picture may include a slice with the slice type that is the same as current slice type. Alternatively, or additionally, the initialized slice QP (Quantization Parameter) is the same as that used in a current slice.

Figure 7:
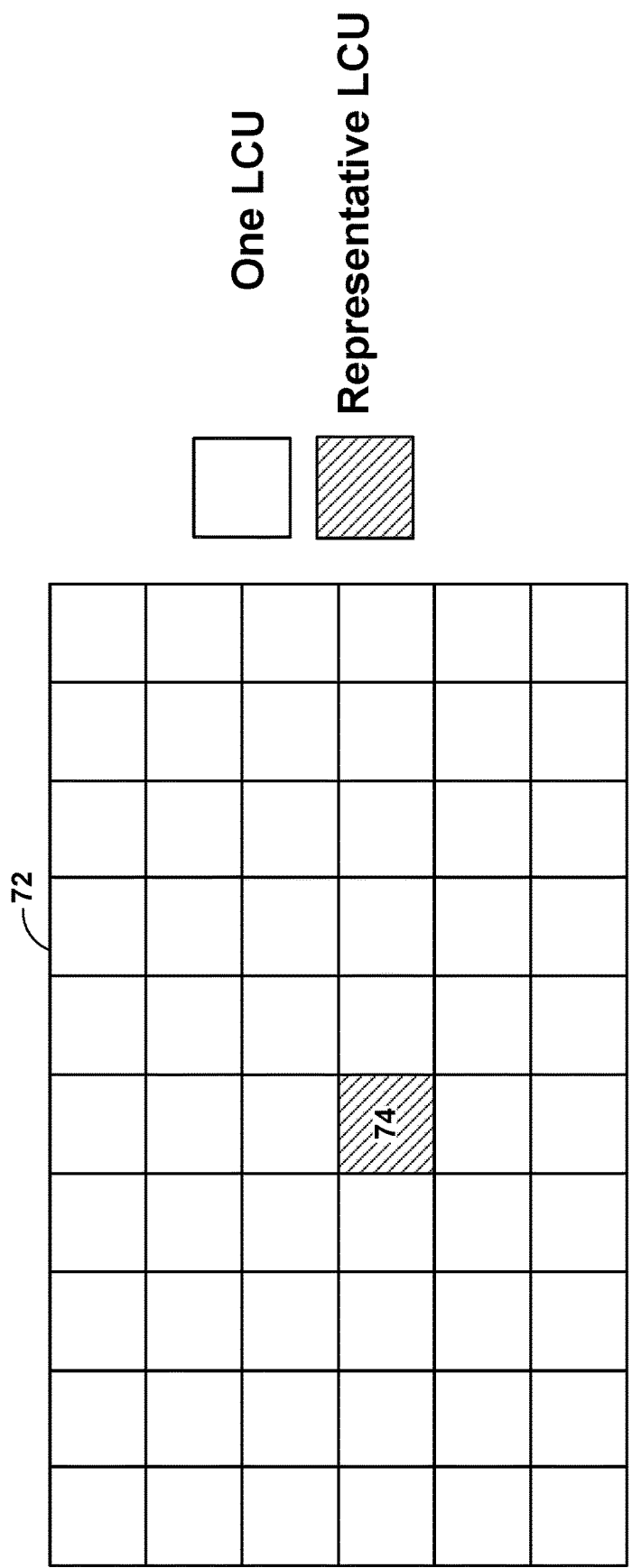
FIG. 7 is an illustration of an example of a slice of video data with multiple largest coding units (LCUs) and a representative LCU.

A video coder may record the states after coding one block with a pre-defined address in the previously coded picture and may use the recorded states as the initialized states of current slice. In some examples, 'one block' represents a LCU (largest coding unit). For example, FIG. 7 is an illustration of an example of one slice 72 of video data with multiple LCUs and the representative LCU 74. The video coder may use the recoded states to determine context initialization for entropy coding.

A video coder may denote the largest coding unit (LCU) size by N×N, and the picture width by W and picture height by H. The number of LCUs within one LCU row, denoted by PicWInCtbsY, is equal to Ceil(W÷N), and the number of LCU rows, denoted by PicHInCtbsY, is equal to Ceil(H÷N) wherein the function Ceil (x) returns the smallest integer greater than or equal to x. In one example, the video coder may define the address of the representative LCU as:

$$TargetCUAddr=(PicWInCtbsY*PicHInCtbsY)/2+PicWInCtbsY/2 \quad (18)$$

Furthermore, when TargetCUAddr is equal to or larger than (PicWInCtbsY*PicHInCtbsY), (e.g., PicHInCtbsY is equal to 1), the video coder may reset TargetCUAddr to (PicWInCtbsY*PicHInCtbsY−1), which is corresponding to the last LCU in one picture.

Figure 8:
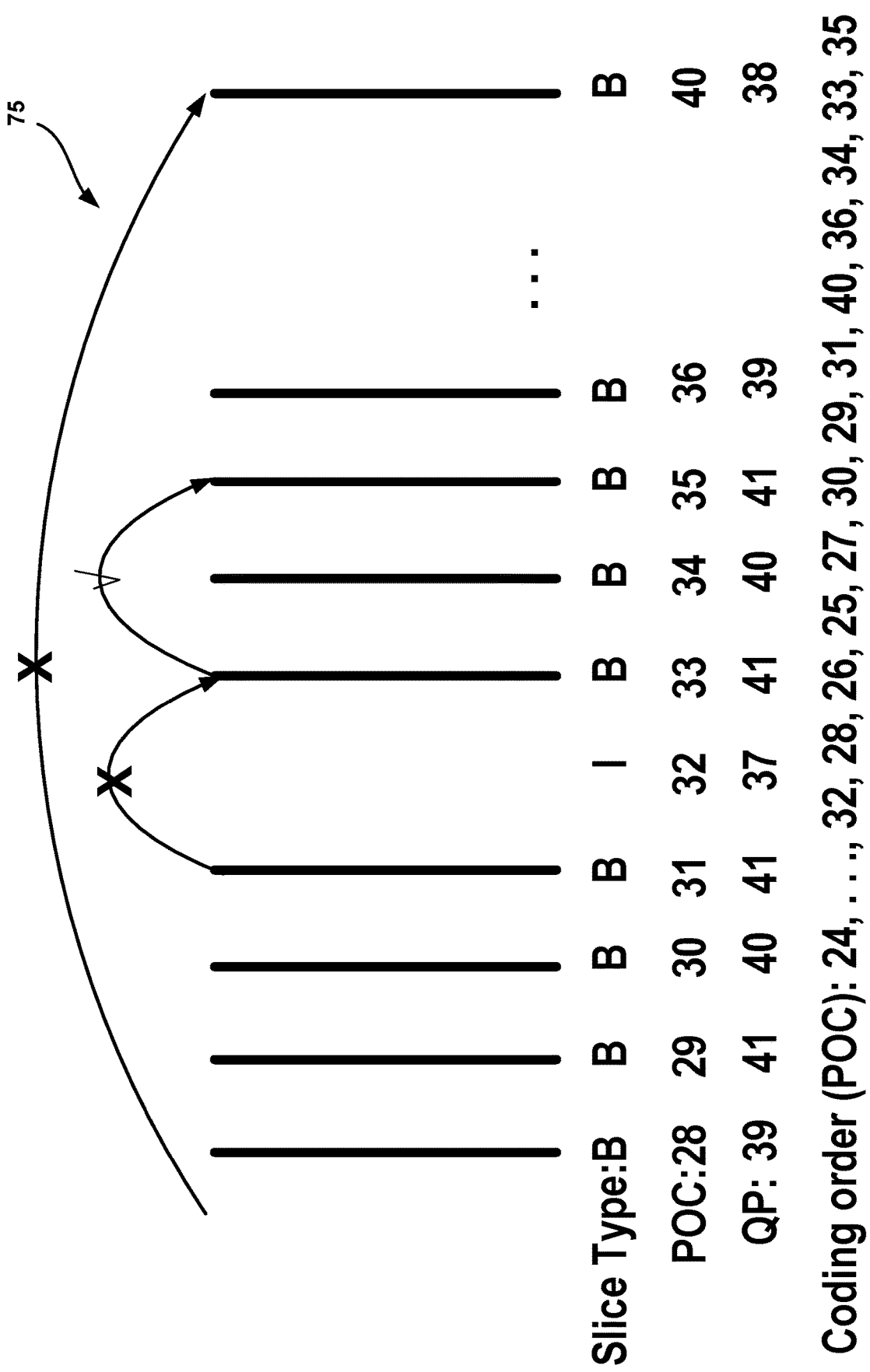
FIG. 8 is an illustration of an example of coding order.

FIG. 8 is an illustration of an example of coding order. In some examples, furthermore, there is no need to apply the above techniques for the first several pictures (a new slice type or a new QP firstly appeared) after a new intra-coded picture in display order. This is to avoid the issues for random access of pictures that occur before coding an I-picture with pictures that occur after coding the I-picture. For example, as shown in FIG. 8, the coding/decoding order for pictures 75 with Picture Order Count (POC) from 28 to 35 is: 32, 28, . . . , 30, 29, 31, 40, 36, 34, 33, 35.

In the display order, the picture with POC equal to 40 is the first picture that is decoded after the I-picture with POC equal to 32. Although the picture with POC equal to 24 has the same QP as the picture with POC equal to 40 and same slice types, the video coder may be disallowed to predict using the coded information of the picture with POC equal to 24 because the picture with POC equal to 40 is after the I-picture with POC equal to 32 and the picture with POC equal to 24 is before the I-picture with POC equal to 32. Similarly, the video coder may be disallowed to predict the picture with POC equal to 33 using the coded information of the picture with POC equal to 31 because the picture with POC equal to 33 is after the I-picture with POC equal to 32 and the picture with POC equal to 31 is before the I-picture with POC equal to 32. In contrast, the video coder may be allowed to predict the picture with POC equal to 35 using the coded information of the picture with POC equal to 33 since both pictures will be displayed after the I-picture with POC equal to 32.

When the prediction from previously coded picture is disallowed, a video coder may apply the initialization techniques, as defined in HEVC (e.g., fixed initialization tables).

Figure 9:
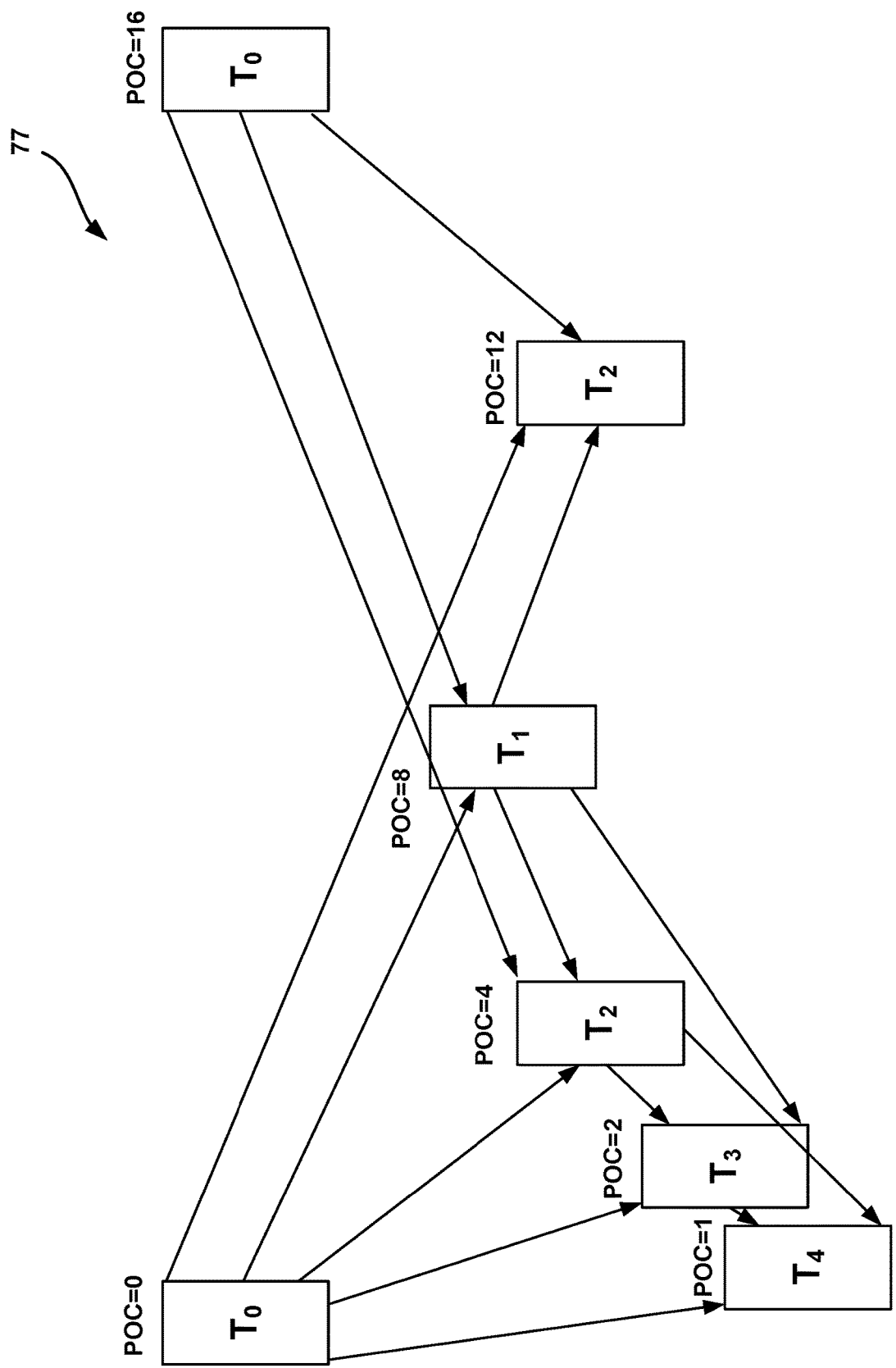
FIG. 9 illustrates an example of random access configuration with a group of pictures (GOP) equal to 16.

FIG. 9 illustrates an example of random access configuration with GOP 77 equal to 16. As defined in the HEVC specification, temporalId is an index for NAL units. The reference picture list, sub-bit stream extraction, and/or other information may rely on temporalId. An example is given in FIG. 9 wherein the GOP size is equal to 16. In this example, five temporal layers are supported (indicated by $T_0$ to $T_4$). The coding/decoding order of pictures are: Picture Order Counter (POC) 0, POC 16, POC8, POC4, POC2, POC1, POC3, POC6, POC5, POC7, POC12, POC10, POC9, POC11, POC14, POC13, POC15. In the example of FIG. 9, POC 0 and POC 16 represent a first temporal layer ('$T_0$'), POC 8 represents a second temporal layer ('$T_1$'), POC 4 and POC 12 represent a third temporal layer ('$T_2$'), POC 2, POC 6, POC 10, and POC 14 represent a fourth temporal layer ('$T_3$'), and POC 1, POC 3, POC5, POC 7, POC 9, POC 11, POC 13, and POC 15 represent a first temporal layer ('$T_4$').

In a first example, suppose there are N contexts in total. Each context is associated with a K-bit variable to indicate a probability state. If one GOP contains multiple frames with different QPs, e.g., for the worst case, 52 allowed QPs may be used for frames within the GOP. In this case, the memory used for storing the context probability states would be N*K*52.

In a second example, how to handle the case that one picture contains multiple slices and/or with slices with different slice QPs, and/or multiple QPs are used for coding one frame for the CITP.

In a third example, assume there are two GOPs and for a frame in the first GOP with T3 (as depicted in FIG. 9) and QP equal to X, and another frame in the second GOP with T1 and QP equal to X. In the current design, the frame in the 2nd GOP may be initialized from the frame in the 1st GOP which is undesirable. That is because it may interrupt the basic rule that decoding a frame with a lower temporal layer index should be independent from a frame with a higher temporal layer index.

The techniques of this disclosure may overcome the various problems discussed above. In particular, techniques for memory reduction/performance improvement of CITP are described herein as follows. The following itemized techniques may be applied individually. Additionally, or alternatively, any combination of the techniques may be applied, and/or any combination of the following techniques and techniques in US Patent Application 2016-0353112, published on Dec. 1, 2016 and entitled "CODING DATA USING AN ENHANCED CONTEXT-ADAPTIVE BINARY ARITHMETIC CODING (CABAC) DESIGN," which is incorporated herein by reference in its entirety, may be applied.

A video coder may use a Quantization Parameter (QP). Examples of QPs are described in US Patent Application 2016-0353112, published on Dec. 1, 2016 and entitled "CODING DATA USING AN ENHANCED CONTEXT-ADAPTIVE BINARY ARITHMETIC CODING (CABAC) DESIGN," which is incorporated herein by reference in its entirety. In some examples, a video coder may use a CITP that associates a QP with the luma component. Alternatively, a video coder may use a CITP that associates QP with a chroma component. In some examples, the 'QP' may indicate the QP associated with a slice. In some examples, the 'QP' may indicate the QP is associated with other kinds of units that contains multiple coding blocks, such as, for example, a tile.

Instead of storing and/or updating the probability states for each QP, a video coder may be configured to store and/or update the probability states for consecutive QPs (also referred to herein as "consecutive quantization parameter values") that share the same probability states. In some examples, consecutive quantization parameter values can share a single probability state, however, in other examples, consecutive quantization parameter values can share multiple probability states. Said differently, for example, a video coder may determine a context initialization (e.g., including probability states) using consecutive quantization parameters (e.g., within a QP range [q0, q1] inclusive) for a portion of a picture of video data decoded using temporal prediction and store the context initialization with a single probability state (or multiple probability states) for the quantization parameters. As used herein, a portion of a picture may refer to, for example, but not limited to, a slice of the picture, a largest coding block of the picture, a tile of the picture, or another portion of the picture. In some examples, for frame/slice QPs in a range [q0, q1] inclusive, a video coder may initialize the probability states from those associated with the same QP index. In some examples, for QPs in a range [q0, q1] inclusive, a video coder may store the probability states to update the states associated with the same QP index. In these examples, the plurality of quantization parameters may be consecutive within a range of quantization parameter values (e.g., [q0, q1]), and consecutive QPs can share the same probability states.

A video coder may signal a flag in SPS, and/or PPS, and/or VPS, and/or slice header to indicate the usage of CITP. In some examples, furthermore, even if a flag signaled in either SPS/PPS/VPS indicates CITP may be enabled, a video coder may further signal a lower level flag, such as in a slice header whether CITP is enabled or disabled. When CITP is disabled for one unit (such as slice), the video coder may apply initialization techniques using a fixed table. In some examples, a video coder may signal an index to indicate the index of initialization methods.

A video coder may apply CITP techniques to certain temporal layers. Said differently, for example, a video coder may store a single probability state for multiple quantization parameters in response to determining a temporal layer for the portion of the picture is enabled.

In some examples, a video coder may disable CITP techniques for the highest temporal layer. Said differently, for example, a video coder may disable a temporal layer for a second portion of a second picture in response to the temporal layer for the second portion of the second picture being a highest temporal layer of a plurality of temporal layers for a group of pictures.

In some examples, for the highest temporal layer, a video coder may update the probability states from a temporal layer lower than the current temporal layer. Said differently, for example, when a temporal layer for the picture is below a highest temporal layer of multiple temporal layers for a group of pictures, to store the single probability state, a video coder may update the single probability state for the highest temporal layer.

In some examples, a video coder may enable CITP techniques when there is at least one previously coded picture and/or slice or one reference picture with the same temporal layer or a smaller temporal layer. In other words, for example, if there are only pictures (or reference pictures) with a larger temporal layer index, the video coder may be configured to disable CITP techniques. Said differently, a video coder may determine a first temporal layer for a portion of a current picture is enabled in response to decoding a previous picture in a second temporal layer that is not greater than the first temporal layer.

A video coder may (only) enable CITP techniques for certain quantization parameters and (automatically) disable remaining quantization parameters. In this case, for example, for some quantization parameters, the video coder may not store and/or update the probability states. Said differently, for example, a video coder may store a single probability state for multiple quantization parameters in response to determining that the quantization parameters are enabled. In addition, for example, for some quantization parameters, the video coder may force the initialization of probability states to be from fixed initialization tables. In some examples, one or more minimum quantization parameters of QP (or named thresholds of QP) and/or the range(s) of quantization parameters that the video coder enables are pre-defined. Said differently, a video coder may determine the quantization parameters are enabled in response to determining that each quantization parameter is within a range of quantization parameter values. In some examples, the video coder may define the minimum QP (threshold) as 17. In yet another example, the video coder may define one range of QPs as [18, 51].

In some examples, the video coder may signal the minimum QP and/or the range(s) of QPs, for example, as a SPS, PPS, View Parameter Set (VPS), and/or other kinds of high-level syntax elements. Said differently, for example, a video decoder may determine the range of quantization parameter values using one or more symbols indicating the range of quantization parameter values from the bitstream. In some examples, a video encoder may signal the range of quantization parameter values using one or more symbols indicating the range of quantization parameter values from the bitstream.

In some examples, the 'QP' may indicate the QP associated with the picture. Said differently, for example, the video coder may enable CITP (e.g., store a single probability state for a plurality of quantization parameters) in response to determining a quantization parameter associated with the portion of the picture satisfies a threshold. For example, when the QP of one picture (containing multiple slices with slice QPs higher than the picture QP) is smaller than the threshold, the video coder may disable CITP for all slices within the picture. In some examples, the 'QP' may indicate the QP associated with a slice. In this example, the video coder may enable CITP for one slice within a picture, but disable CITP for another slice within the same picture. In some examples, the 'QP' may indicate the QP associated with other kinds of units that contain multiple coding blocks, such as tiles.

A video coder may classify contexts into multiple groups. For example, the video coder may enable CITP for one group and disable CITP for another groups within one picture/slice/other kind of unit that contains multiple coding blocks. Said differently, for example, a video coder may store a single probability state for multiple quantization parameters in response to determining that a group assigned to the portion is enabled. In some examples, the group may be classified by one or more of intra prediction mode or inter prediction mode, luma components or chroma components, filter parameters or other parameters, transform coefficient information coding or other information, or other groups. In some examples, the video coder may classify contexts associated with intra (such as intra prediction mode) and inter coding (such as merge flags) into two groups. In some examples, the video coder may classify contexts associated with luma and chroma components into two groups. In some examples, whether to apply CITP for luma related context may depend on the QP associated with a luma component, while whether to apply CITP for chroma related context may depend on the QP associated with one/two chroma components. In some examples, the video coder may classify contexts associated with filter parameters and others into two groups. In some examples, the video coder may classify contexts associated with transform coefficient coding and others into two groups.

Figure 10:
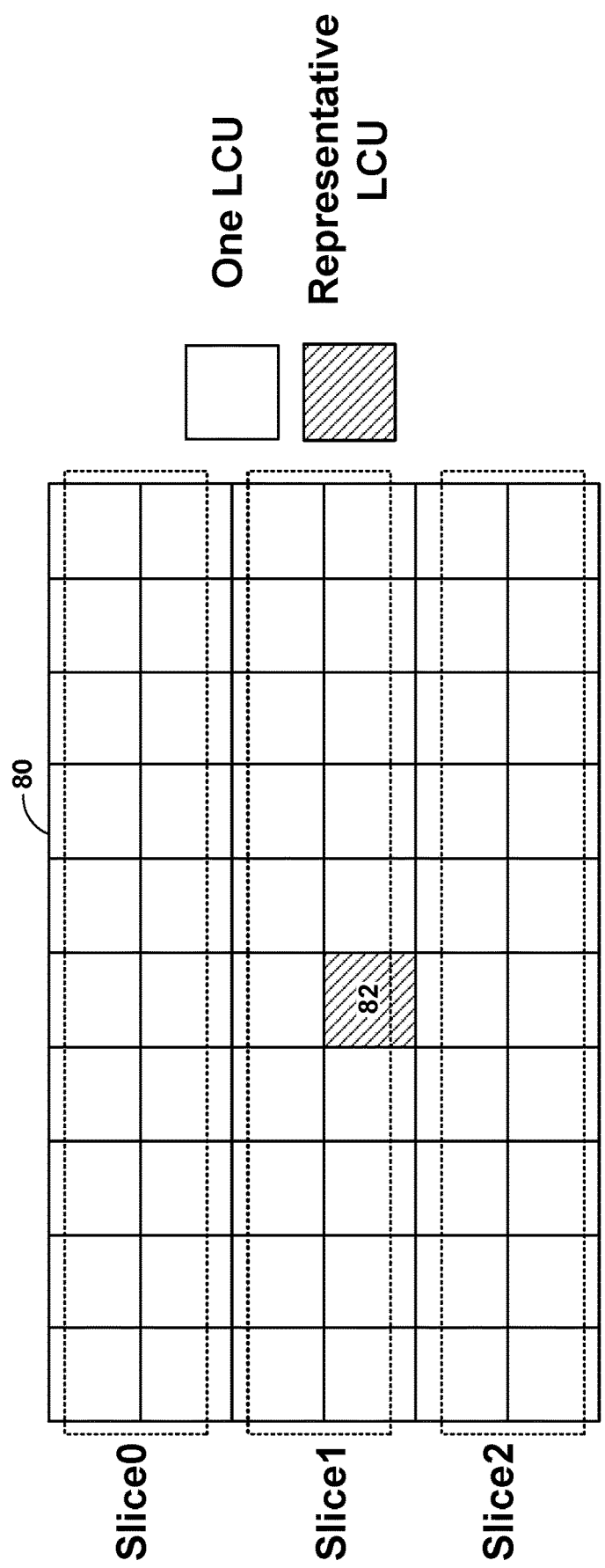
FIG. 10 is an illustration of a representative LCU, with all slices sharing common slice luma and/or chroma quantization parameters (QPs).

In the example of FIG. 10, when one picture 80 is split into multiple slices (or other units that contain multiple coding blocks), the video coder may store and/or use probability states after coding one or multiple representative LCUs 82 to initialize the following slices. In some examples, if multiple slices are associated with the same slice luma and/or chroma QPs, the rule as defined in US Patent Application 2016-0353112, published on Dec. 1, 2016 and entitled "CODING DATA USING AN ENHANCED CONTEXT-ADAPTIVE BINARY ARITHMETIC CODING (CABAC) DESIGN," which is incorporated herein by reference in its entirety, may be used to select one representative LCU, as depicted in FIG. 10.

Figure 11:
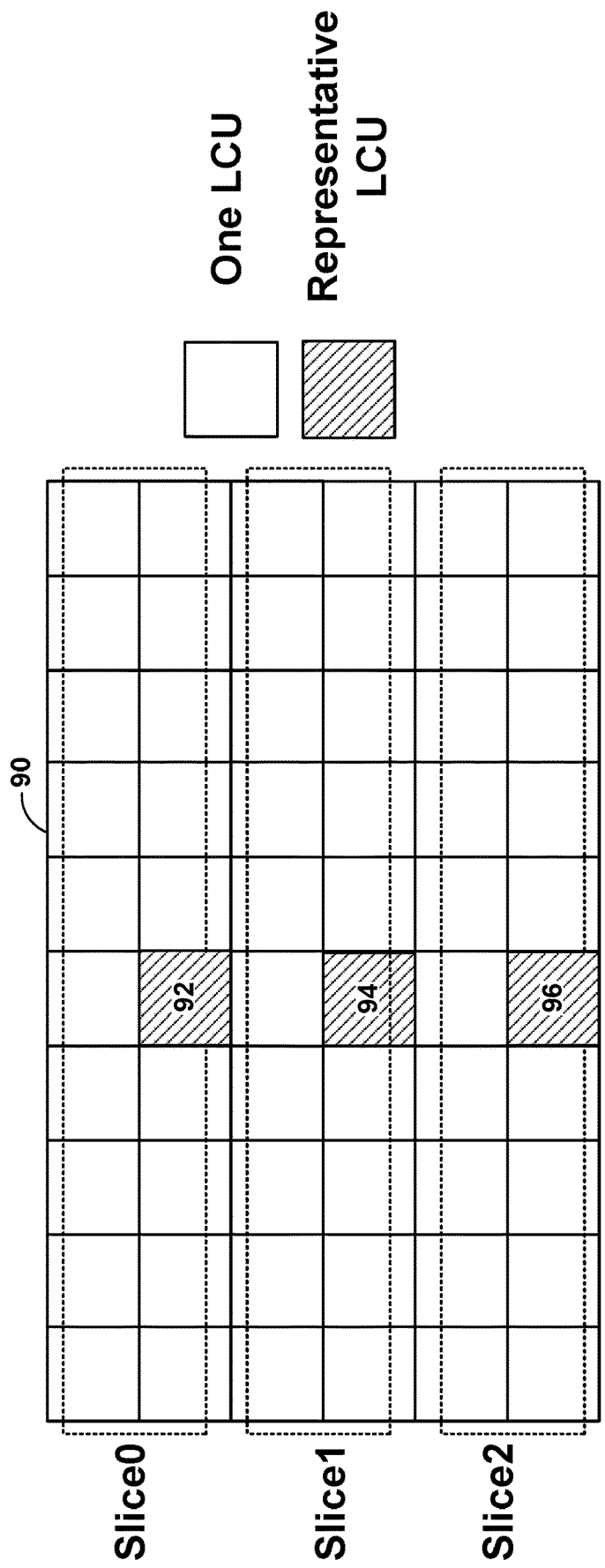
FIG. 11 is an illustration of multiple representative LCUs, with all slices having different slice luma and/or chroma QPs.

In the example of FIG. 11, the video coder may select one representative LCU for each slice. As shown, a video coder may select representative LCU 92 for Slice® of picture 90, representative LCU 94 for Slice1 of picture 90, and representative LCU 96 for Slice2 of picture 90. For example, if multiple slices are associated with different slice luma and/or chroma QPs, the rule as defined in US Patent Application 2016-0353112 may be used by the video coder to select one representative LCU for each slice, as depicted in FIG. 11. In this case, the picture width and height for deriving the representative LCU's address may be replaced by the slice width and height. In some examples, if two of the multiple slices share the same slice luma and/or chroma QPs, the video coder may select (only) one representative LCU.

When one picture is split into one or multiple slices (or other units that contain multiple coding blocks), and multiple QPs may be enabled for coding one slice, the video coder may apply the following techniques. In some examples, the video coder may use the luma QP associated with a slice (or picture containing the current slice or other unit) to select the stored probability states with the same luma QP. In some examples, the video coder may use the luma QP associated with a slice (or picture containing the current slice or other unit) to update the stored probability states with the same luma QP. In some examples, the video coder may use a function of one or multiple blocks within a slice (or picture containing the current slice or other unit) to derive a QP and to update the stored probability states with the same derive QP. In some examples, the video coder may define the average/minimum/maximum of QPs from the selected blocks within the slice to derive the QP.

Figure 12:
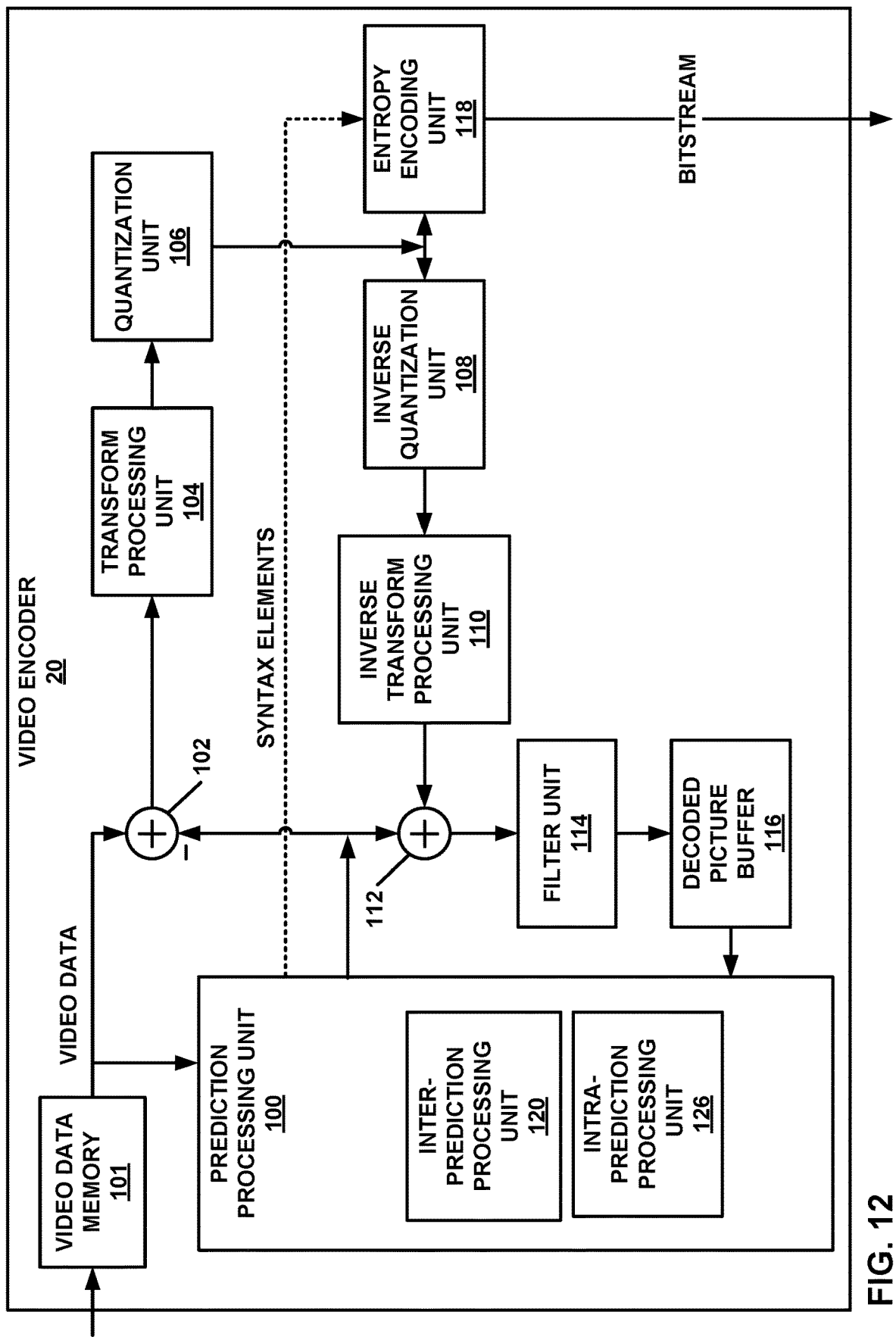
FIG. 12 is a block diagram illustrating an example video encoder that may implement one or more techniques described in this disclosure.

FIG. 12 is a block diagram illustrating an example video encoder 20 that may implement the techniques of this disclosure. FIG. 12 is provided for purposes of explanation and should not be considered limiting of the techniques as broadly exemplified and described in this disclosure. The techniques of this disclosure may be applicable to various coding standards or methods.

In the example of FIG. 12, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown). It should be understood that video encoder 20 may perform one or more techniques of this disclosure.

Video data memory 101 may be configured to store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components. Video data memory 101 may be the same as or part of storage media 20 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU. If a PU is in a B slice, inter-prediction processing unit 120 may use uni-directional or bi-directional inter prediction to generate a predictive block of the PU.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents values of transform coefficients for a CU. Entropy encoding unit 118 may be configured to perform CITP. For example, entropy encoding unit 118 may be configured to store context initialization and entropy encode using the context initialization.

Figure 13:
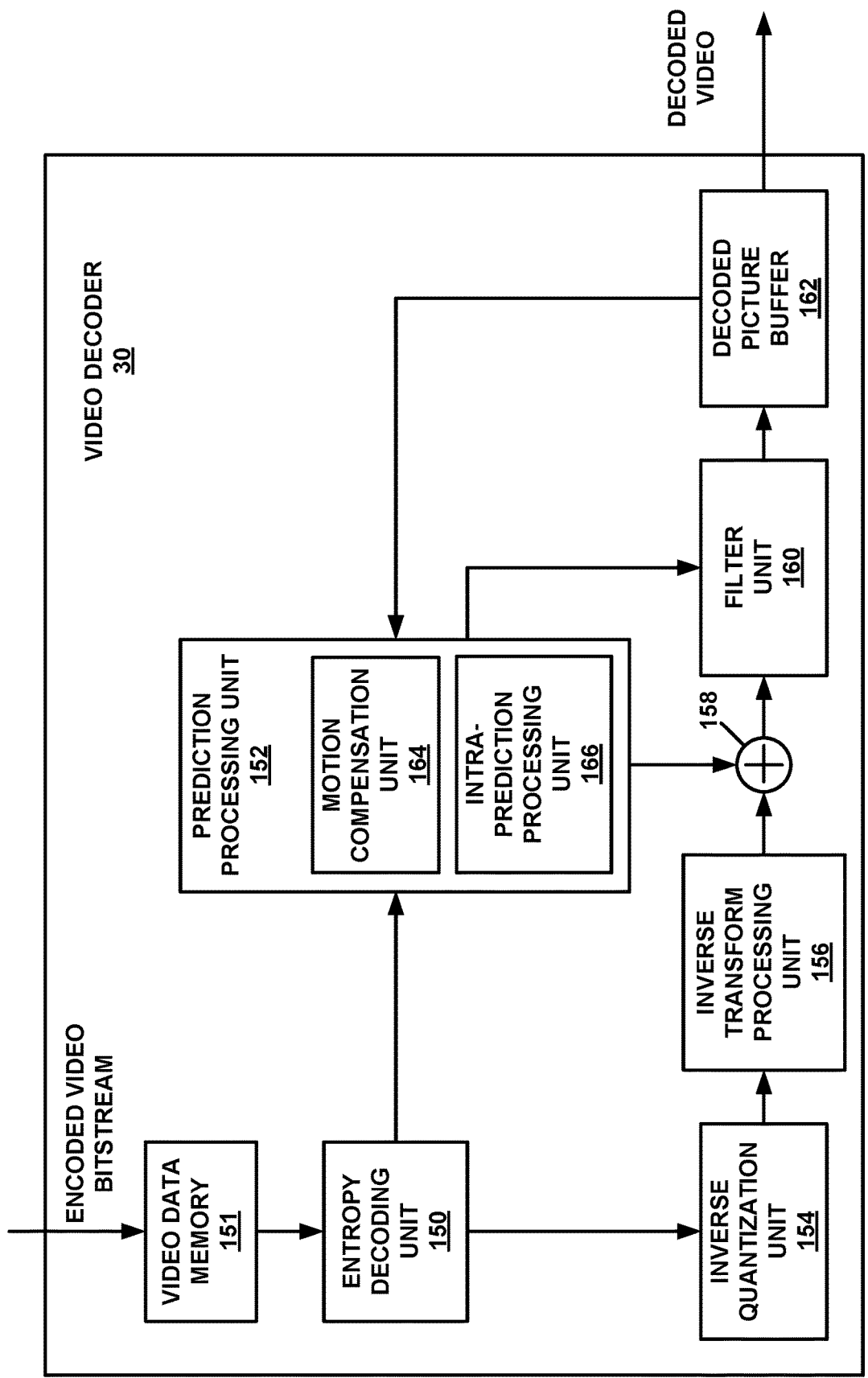
FIG. 13 is a block diagram illustrating an example video decoder that may implement one or more techniques described in this disclosure.

FIG. 13 is a block diagram illustrating an example video decoder 30 that is configured to implement the techniques of this disclosure. FIG. 13 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods. It should be understood that video decoder 30 may perform one or more techniques of this disclosure. In some examples, encoder 20 and decoder 30 may be configured to perform reciprocal techniques.

In the example of FIG. 13, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118. Entropy decoding unit 150 may be configured to perform CITP. For example, Entropy decoding unit 150 may be configured to store context initialization and entropy decode using the context initialization.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

Inverse quantization unit 154 may perform particular techniques of this disclosure. For example, for at least one respective quantization group of a plurality of quantization groups within a CTB of a CTU of a picture of the video data, inverse quantization unit 154 may derive, based at least in part on local quantization information signaled in the bitstream, a respective quantization parameter for the respective quantization group. Additionally, in this example, inverse quantization unit 154 may inverse quantize, based on the respective quantization parameter for the respective quantization group, at least one transform coefficient of a transform block of a TU of a CU of the CTU. In this example, the respective quantization group is defined as a group of successive, in coding order, CUs or coding blocks so that boundaries of the respective quantization group must be boundaries of the CUs or coding blocks and a size of the respective quantization group is greater than or equal to a threshold. Video decoder 30 (e.g., inverse transform processing unit 156, reconstruction unit 158, and filter unit 160) may reconstruct, based on inverse quantized transform coefficients of the transform block, a coding block of the CU.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

Figure 14:
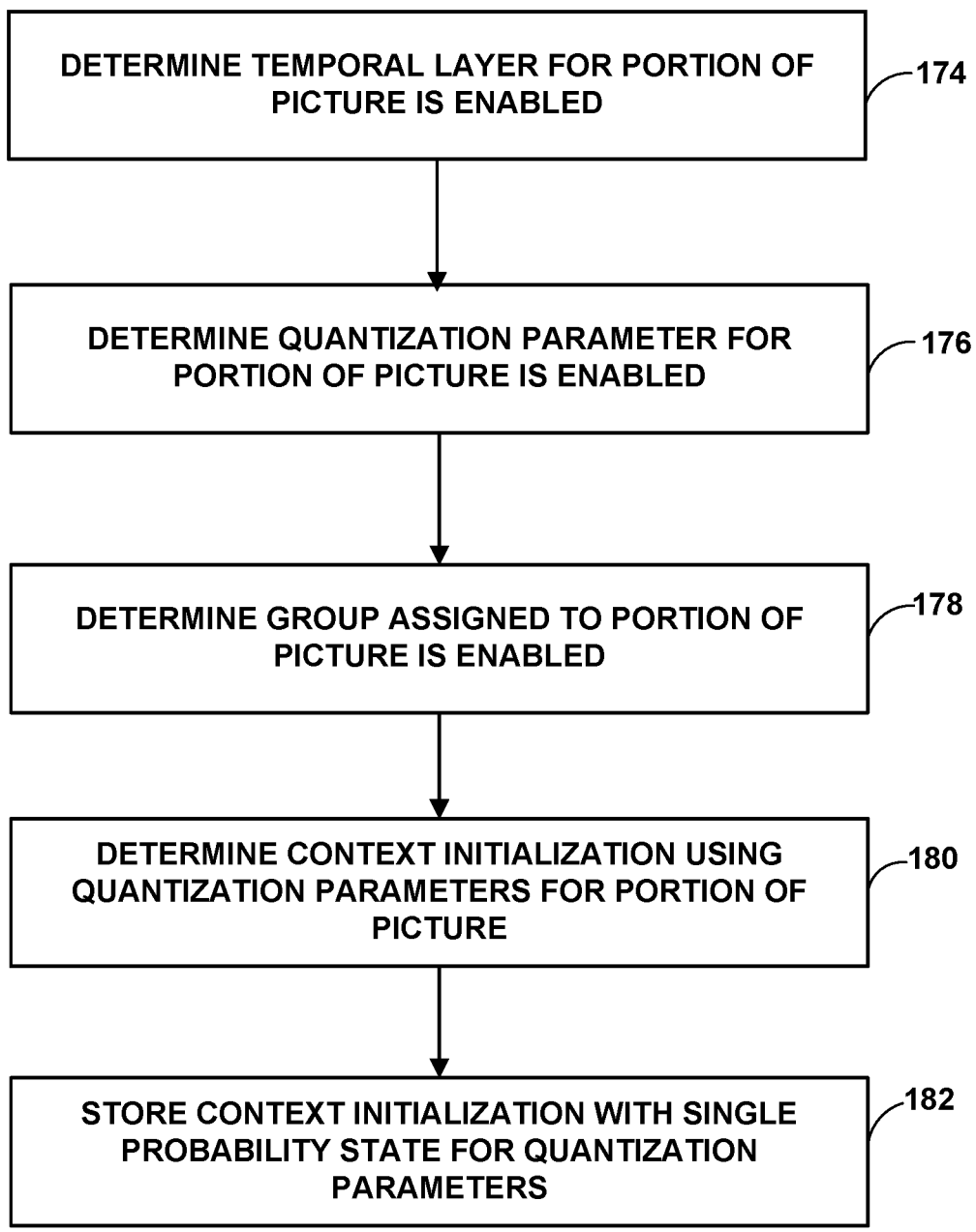
FIG. 14 is a flowchart illustrating techniques for storing context initialization.

FIG. 14 is a flowchart illustrating techniques for storing context initialization. A video coder (e.g., video encoder 20, video decoder 30, etc.) determines a temporal layer for a portion of a picture is enabled (174). For example, the video coder may determine a first temporal layer for the portion of the current picture is enabled in response to decoding a previous picture in a second temporal layer that is not greater than the first temporal layer. The previous picture is decoded before the current picture is decoded.

The video coder determines a quantization parameter for the portion of the picture is enabled (176). For example, the video coder may determine quantization parameters are enabled in response to determining that each quantization parameter is within a range of quantization parameter values. In some examples, the video coder may determine the range of quantization parameter values using one or more symbols indicating the range of quantization parameter values from the bitstream.

The video coder determines a group assigned to the portion of the picture is enabled (178). For example, the video coder may determine the portion of the picture is assigned to a group for intra prediction mode or inter prediction mode that is enabled, a group for luma components or chroma components that is enabled, a group for filter parameters or other parameters that is enabled, a group for transform coefficient information coding or other information that is enabled or another enabled group.

The video coder determines context initialization using the quantization parameters for the portion of the picture (180). For example, the video coder determines information to calculate a probability value for entropy coding (e.g., encoding, decoding, etc.) or a probability value that is assigned to the quantization parameters for the portion of the picture. The video coder stores the context initialization with a single probability state for the quantization parameters (182). For example, video encoder 20 may store the context initialization with the single probability state for the quantization parameters at video data memory 101 or another memory of video encoder 20. In some examples, video decoder 30 may store the context initialization with the single probability state for the quantization parameters at video data memory 151 or another memory of video decoder 30.

Figure 15:
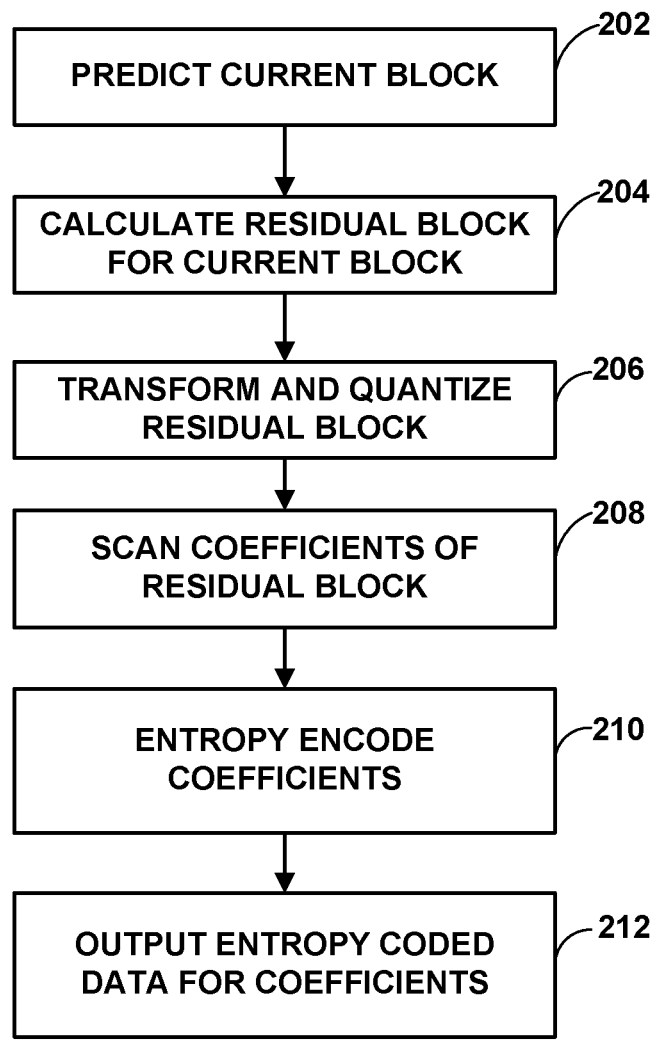
FIG. 15 is a flowchart illustrating techniques for encoding using context initialization.

FIG. 15 is a flowchart illustrating techniques for encoding using context initialization. The current block may include a current CU or a portion of the current CU. Although described with respect to video encoder 20, it should be understood that other devices may be configured to perform a method similar to that of FIG. 15.

In this example, video encoder 20 predicts the current block (202). For example, video encoder 20 may calculate one or more prediction units (PUs) for the current block. Video encoder 20 may then calculate a residual block for the current block, e.g., to produce a transform unit (TU) (204). To calculate the residual block, video encoder 20 may calculate a difference between the original, uncoded block and the predicted block for the current block. Video encoder 20 may then transform the residual block to produce transform coefficients, and quantize the transform coefficients of the residual block (206). Next, video encoder 20 may scan the quantized transform coefficients of the residual block (208).

During the scan, or following the scan, video encoder 20 may entropy encode the coefficients (210). For example, video encoder 20 may encode the coefficients using CABAC. In particular, in accordance with the techniques of this disclosure, entropy encoding unit 118 of video encoder 20 may encode the quantized transform coefficients using context initialization. Video encoder 20 may then output the entropy coded data of the block (212).

Techniques described herein may reduce a usage of memory by video coders for context initialization techniques, particularly CITP. For example, by configuring a video coder to determine context initialization using multiple quantization parameters for a portion of a picture of video data decoded using temporal prediction and storing the context initialization with a single probability state for the quantization parameters, the video coder may reduce a number of probability states stored in the memory for the multiple quantization parameters. In this way, a video coder may reduce an amount of memory used for storing context initialization, which may improve a processing performance of the video coder and/or reduce a power usage by the video coder.

In another example, by configuring a video coder to store a context initialization in response to determining a temporal layer for the portion of the picture is enabled, the video coder may reduce a number of probability states stored in a memory. In another example, configuring a video coder to store a context initialization in response to determining that quantization parameters are enabled, the video coder may reduce a number of probability states stored in a memory. In another example, configuring a video coder to store a context initialization in response to determining a quantization parameter associated with the portion of the picture satisfies a threshold, the video coder may reduce a number of probability states stored in a memory. Using one or more techniques described herein to reduce a number of probability states stored in a memory, a video coder may reduce an amount of memory used for storing context initialization, which may improve a processing performance of the video coder and/or reduce a power usage by the video coder.

Figure 16:
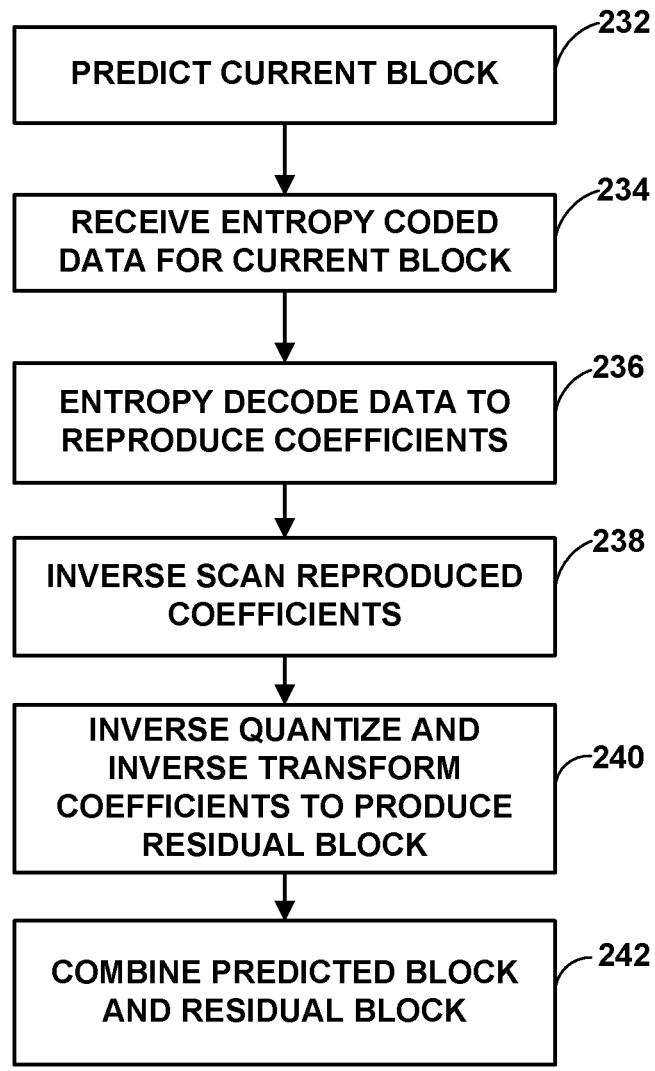
FIG. 16 is a flowchart illustrating techniques for decoding using context initialization.

FIG. 16 is a flowchart illustrating techniques for decoding using context initialization. The current block may include a current CU or a portion of the current CU. Although described with respect to video decoder 30, it should be understood that other devices may be configured to perform a method similar to that of FIG. 16.

Video decoder 30 may predict the current block (232), e.g., using an intra- or inter-prediction mode to calculate a predicted block for the current block. Video decoder 30 may also receive entropy coded data for the current block, such as entropy coded data for coefficients of a residual block corresponding to the current block (234).

Video decoder 30 may entropy decode the entropy coded data to reproduce coefficients of the residual block (236). In particular, in accordance with the techniques of this disclosure, entropy decoding unit 150 of video decoder 30 may decode the quantized transform coefficients using context initialization. Video decoder 30 may then inverse scan the reproduced coefficients (238), to create a block of quantized transform coefficients. Video decoder 30 may then inverse quantize and inverse transform the coefficients to produce a residual block (240). Video decoder 30 may ultimately decode the current block by combining the predicted block and the residual block (242).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by fixed function and/or programmable processing circuitry, including one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining, by a video decoder implemented in processing circuitry, a context initialization using a plurality of quantization parameters for a portion of a picture of video data decoded using temporal prediction;
    determining, by the video decoder, that each quantization parameter of the plurality of quantization parameters is within a range of quantization parameter values of a set of allowed quantization parameter values, wherein the set of allowed quantization parameter values further includes one or more remaining quantization values that are not within the range of quantization parameter values;
    in response to determining that each quantization parameter of the plurality of quantization parameters is within the range, storing, by the video decoder, the context initialization with a single probability state for the plurality of quantization parameters; and
    entropy decoding, by the video decoder, a set of syntax elements in a bitstream using the single probability state.

2. The method of claim 1, wherein the plurality of quantization parameters comprise consecutive quantization parameter values within the range of quantization parameter values of the set of allowed quantization parameter values.

3. The method of claim 1, wherein storing the context initialization with the single probability state comprises updating the single probability state.

4. The method of claim 1, wherein storing the context initialization with the single probability state is further in response to determining a temporal layer for the portion of the picture is enabled.

5. The method of claim 4, wherein the picture is a current picture and wherein the temporal layer is a first temporal layer, the method further comprising:
    determining, by the video decoder, the first temporal layer for the portion of the current picture is enabled in response to decoding a previous picture in a second temporal layer that is not greater than the first temporal layer, wherein the video decoder decodes the previous picture before decoding the current picture.

6. The method of claim 1, wherein a temporal layer for the picture is below a highest temporal layer of a plurality of temporal layers for a group of pictures comprising the picture and wherein storing the context initialization with the single probability state comprises updating the single probability state for the highest temporal layer.

7. The method of claim 1, wherein the picture is a first picture, the method further comprising:
    determining, by the video decoder, a temporal layer for a second portion of a second picture is disabled in response to the temporal layer for the second portion of the second picture being a highest temporal layer of a plurality of temporal layers for a group of pictures comprising the first picture and the second picture.

8. The method of claim 1, further comprising:
    determining, by the video decoder, the range of quantization parameter values using one or more symbols indicating the range of quantization parameter values from the bitstream.

9. The method of claim 1, wherein storing the context initialization with the single probability state is further in response to determining a quantization parameter associated with the portion of the picture satisfies a threshold.

10. The method of claim 1, wherein storing the context initialization with the single probability state is further in response to determining that a group assigned to the portion of the picture is enabled, and wherein the group is classified by one or more of the group consisting of:
    intra prediction mode or inter prediction mode;
    luma components or chroma components;
    filter parameters or other parameters; or
    transform coefficient information coding.

11. The method of claim 1, wherein the portion of the picture is a slice of the picture;
    wherein the portion of the picture is a largest coding block of the picture; or
    wherein the portion of the picture is a tile of the picture.

12. A device for decoding video data, the device comprising:
    one or more storage media; and
    one or more processors configured to:
        determine a context initialization using a plurality of quantization parameters for a portion of a picture of video data decoded using temporal prediction;
        determine that each quantization parameter of the plurality of quantization parameters is within a range of quantization parameter values of a set of allowed quantization parameter values, wherein the set of allowed quantization parameter values further includes one or more remaining quantization values that are not within the range of quantization parameter values;
        in response to determining that each quantization parameter of the plurality of quantization parameters is within the range, store, at the one or more storage media, the context initialization with a single probability state for the plurality of quantization parameters; and
        entropy decode a set of syntax elements in a bitstream using the single probability state.

13. The device of claim 12, wherein the plurality of quantization parameters comprise consecutive quantization parameter values within the range of quantization parameter values of the set of allowed quantization parameter values.

14. The device of claim 12, wherein, to store the context initialization with the single probability state, the one or more processors are configured to update the single probability state.

15. The device of claim 12, wherein storing the context initialization with the single probability state is further in response to determining a temporal layer for the portion of the picture is enabled.

16. The device of claim 15, wherein the picture is a current picture, wherein the temporal layer is a first temporal layer, and wherein the one or more processors are further configured to:
determine the first temporal layer for the portion of the current picture is enabled in response to decoding a previous picture in a second temporal layer that is not greater than the first temporal layer, wherein the one or more processors are configured to decode the previous picture before decoding the current picture.

17. The device of claim 12, wherein a temporal layer for the picture is below a highest temporal layer of a plurality of temporal layers for a group of pictures comprising the picture and wherein, to store the context initialization with the single probability state, the one or more processors are configured to update the single probability state for the highest temporal layer.

18. The device of claim 12, wherein the picture is a first picture and wherein the one or more processors are configured to:
determine a temporal layer for a second portion of a second picture is disabled in response to the temporal layer for the second portion of the second picture being a highest temporal layer of a plurality of temporal layers for a group of pictures comprising the first picture and the second picture.

19. The device of claim 12, wherein the one or more processors are configured to determine the range of quantization parameter values using one or more symbols indicating the range of quantization parameter values from the bitstream.

20. The device of claim 12, wherein storing the context initialization with the single probability state is further in response to determining a quantization parameter associated with the portion of the picture satisfies a threshold.

21. The device of claim 12, wherein, to store the context initialization with the single probability state, the one or more processors are configured to store the context initialization with the single probability state further in response to determining that a group assigned to the portion of the picture is enabled, and wherein the group is classified by one or more of the group consisting of:
intra prediction mode or inter prediction mode;
luma components or chroma components;
filter parameters or other parameters; or
transform coefficient information coding or other information.

22. The device of claim 12, wherein the portion of the picture is a slice of the picture;
wherein the portion of the picture is a largest coding block of the picture; or
wherein the portion of the picture is a tile of the picture.

23. The device of claim 12, wherein the device comprises a wireless communication device, further comprising a receiver configured to receive encoded video data.

24. The device of claim 23, wherein the wireless communication device comprises a telephone handset and wherein the receiver is configured to demodulate, according to a wireless communication standard, a signal comprising the encoded video data.

25. A method of encoding video data, the method comprising:
determining, by a video encoder implemented in processing circuitry, a context initialization using a plurality of quantization parameters for a portion of a picture of video data encoded using temporal prediction;
determining, by the video encoder, that each quantization parameter of the plurality of quantization parameters is within a range of quantization parameter values of a set of allowed quantization parameter values, wherein the set of allowed quantization parameter values further includes one or more remaining quantization values that are not within the range of quantization parameter values;
in response to determining that each quantization parameter of the plurality of quantization parameters is within the range enabled, storing, by the video encoder, the context initialization with a single probability state for the plurality of quantization parameters; and
entropy encoding, by the video encoder, a set of syntax elements in a bitstream using the single probability state.

26. A device for encoding video data, the device comprising:
one or more storage media configured to store video data; and
one or more processors configured to:
determine a context initialization using a plurality of quantization parameters for a portion of a picture of video data encoded using temporal prediction;
determine that each quantization parameter of the plurality of quantization parameters is within a range of quantization parameter values of a set of allowed quantization parameter values, wherein the set of allowed quantization parameter values further includes one or more remaining quantization values that are not within the range of quantization parameter values;
in response to determining that each quantization parameter of the plurality of quantization parameters is within the range, store, at the one or more storage media, the context initialization with the single probability state for the plurality of quantization parameters; and
entropy encode a set of syntax elements in a bitstream using the single probability state.

* * * * *